(12) United States Patent
Cotteverte et al.

(10) Patent No.: US 6,542,682 B2
(45) Date of Patent: Apr. 1, 2003

(54) ACTIVE PHOTONIC CRYSTAL WAVEGUIDE DEVICE

(75) Inventors: Jean-Charles J. C. Cotteverte, Montreal (CA); Bernard A. Eid, Corning, NY (US); Christophe F. P. Renvaze, Avon (FR)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/930,082

(22) Filed: Aug. 15, 2001

(65) Prior Publication Data

US 2002/0048422 A1 Apr. 25, 2002

Related U.S. Application Data

(60) Provisional application No. 60/225,488, filed on Aug. 15, 2000.

(51) Int. Cl.[7] .................................................. G02B 6/02
(52) U.S. Cl. ............................... 385/125; 385/4; 385/8; 385/40; 385/129; 385/142
(58) Field of Search ........................... 385/4, 8, 10, 40, 385/123, 125, 129, 141, 142

(56) References Cited

U.S. PATENT DOCUMENTS

| | | | |
|---|---|---|---|
| 5,091,983 A | * | 2/1992 | Lukosz ........................ 385/13 |
| 5,389,943 A | | 2/1995 | Brommer et al. |
| 5,973,823 A | | 10/1999 | Koops et al. |
| 5,982,963 A | * | 11/1999 | Feng et al. .................... 385/37 |
| 6,064,506 A | | 5/2000 | Koops |
| 6,075,915 A | | 6/2000 | Koops et al. |
| 6,101,300 A | | 8/2000 | Fan et al. |
| 6,134,369 A | | 10/2000 | Kurosawa |
| 6,175,671 B1 | | 1/2001 | Roberts |
| 6,243,522 B1 | | 6/2001 | Allan et al. |
| 6,256,428 B1 | | 7/2001 | Norwood et al. |
| 6,278,105 B1 | | 8/2001 | Mattia |

FOREIGN PATENT DOCUMENTS

| | | |
|---|---|---|
| EP | 1 099 963 | 5/2001 |
| WO | WO 98/53351 | 2/1995 |

OTHER PUBLICATIONS

A. Mekis et al., "High Transmission through Sharp Bends in Photonic Crystal Waveguides", *Physical Review Letters*, Oct. 28, 1996, vol. 77, No. 18, pp. 3787–3790.

E. Chow et al., "Three-dimensional control of light in a two-dimensional photonic crystal slab", *Letters to Nature*, Oct. 26, 2000, vol. 407, pp. 983–986.

(List continued on next page.)

Primary Examiner—Akm E. Ullah
Assistant Examiner—Jennifer Doan
(74) Attorney, Agent, or Firm—James V. Suggs

(57) ABSTRACT

Active photonic crystal devices for controlling an optical signal is disclosed. The devices include a planar photonic crystal with a defect waveguide. In one embodiment of the invention, the propagation of the optical signal is controlled by changing a dimension of the planar photonic crystal structure. In another embodiment, the propagation of the optical signal is controlled by inserting rods into the columnar holes of the planar photonic crystal structure. In a third embodiment of the invention, the propagation of the optical signal is controlled by filling the holes of the planar photonic crystal structure with fluid.

24 Claims, 37 Drawing Sheets

OTHER PUBLICATIONS

S. Kuchinsky et al., "3D localization in a channel waveguide in a photonic crystal with 2D periodicity", *Optics Communications*, Feb. 15, 2000, vol. 175, pp. 147–152.

H. Benisty et al., "Radiation losses of waveguide–based two–dimensional photonic crystals: Positive role of the substrate", *Applied Physics Letters*, Jan. 31, 2000, vol. 76, No. 5, pp. 532–534.

I. El–Kady et al., "Dielectric Waveguides in Two–Dimensional Photonic Bandgap Materials", *Journal of Lightwave Technology*, Nov. 1999, vol. 17, No. 11, pp. 2042–2049.

C.J.M. Smith et al., "Low–loss channel waveguides with two–dimensional photonic crystal boundaries", *Applied Physics Letters*, Oct. 30, 2000, vol. 77, No. 18, pp. 2813–2815.

M. Loncar et al., "Waveguiding in planar photonic crystals", *Applied Physics Letters*, Sep. 25, 2000, vol. 77, No. 13, pp. 1937–1939.

P. Tran, "Photonic–band–structure calculation of material possessing Kerr nonlinearity", *Physical Review B*, Oct. 15, 1995, vol. 52, No. 15, pp. 10673–10676.

S. Johnson et al., "Guided modes in photonic crystal slabs", *Physical Review B*, Aug. 15, 1999, vol. 60, No. 8, pp. 5751–5758.

X. Zhang et al., "Enlarging a photonic band gap by using insertion", *Physical Review B*, Jan. 15, 2000, vol. 61, No. 3, pp. 1892–1897.

M. Loncar et al. "Design and Fabrication of Silicon Photonic Crystal Optical Waveguides", *Journal of Lightwave Technology*, Oct. 2000, vol. 18, No. 10, pp. 1402–1411.

D. Labilloy et al., "Quantitative Measurement of Transmission, Reflection, and Diffraction of Two–Dimensional Photonic Band Gap Structures at Near–Infrared Wavelengths", *Physical Review Letters*, Nov. 24, 1997, vol. 79, No. 21, pp. 4147–4150.

A. Yu. Sivachenko et al., "Excitations in photonic crystals infiltrated with polarizable media", *Physical Review A*, Jun. 8, 2001, vol. 64, pp. 013809–1 through 013809–8.

Moosburger et al. "Semiconductor Lasers with 2D Photonic Crystal Mirrors Based on a Wet–Oxidized Al2O3–Mask", IEEE Photonics Tech. Letters, May 2001, vol. 13, No. 5, pp. 406–408.

Monat et al., "InP 2d Photonic Crystal Microlasers on Silicon Wafer: Room Temperature Operation at 1.55 $\mu$m", Electronics Letters, Jun. 7, 2001, vol. 37, No. 12, pp. 764–765.

* cited by examiner

[A-a] and {B-b} connected

[A-B] and [a-b] connected

ACTIVE PHOTONIC CRYSTAL WAVEGUIDE DEVICE

CROSS-REFERENCE TO RELATED APPLICATIONS

This application claims priority under 35 U.S.C §119(e) to U.S. Provisional Application No. 60/225,488, filed Aug. 15, 2000, which is incorporated herein by reference.

BACKGROUND OF THE INVENTION

1. Field of the Invention

The present invention relates generally to an optical waveguide structure for an optical communication system, and particularly to a planar photonic crystal waveguide for implementing a variety of optical functions in an optical communication system.

2. Technical Background

Photonic crystals are periodic optical materials. The characteristic defining a photonic crystal structure is the periodic arrangement of dielectric or metallic elements along one or more axes. Thus, photonic crystals can be one-, two-, and three-dimensional. Most commonly, photonic crystals are formed from a periodic lattice of dielectric material. When the dielectric constants of the materials forming the lattice are different (and the materials absorb minimal light), the effects of scattering and Bragg diffraction at the lattice interfaces control the propagation of optical signals through the structure. These photonic crystals can be designed to prohibit optical signals of certain frequencies from propagating in certain directions within the crystal structure. The range of frequencies for which propagation is prohibited is known as the photonic band gap.

An exemplary two dimensional photonic crystal which is periodic in two directions and homogeneous in a third is shown in FIG. 1. More specifically, the photonic crystal 10 is fabricated from a volume of bulk material 12 having a square lattice of cylindrical air-filled columns 14 extending through the bulk material in the z-axis direction and periodic in the x-axis and y-axis directions. For normal theoretical analysis and modeling, the photonic crystal 10 has conventionally been assumed to be homogeneous and infinite in the z-axis direction. In this exemplary figure, the plane of the two dimensional photonic crystal is the xy plane.

Another exemplary photonic crystal is shown in FIG. 2. The photonic crystal 15 is similar to the photonic crystal 10, but the cylindrical air-filled columns are disposed in a hexagonal array. A third exemplary two-dimensional photonic crystal is shown in FIG. 3. The photonic crystal 16 is also similar to photonic crystal 10, but consists of an array of dielectric columns 18 in an air background.

The propagation of optical signals in these structures is determined by a variety of parameters, including, for example, the radius of the columns, the pitch (center-to-center spacing of the columns) of the photonic crystal, the structural symmetry of the crystal (e.g. square, triangular, hexagonal, rectangular), and the lattice refractive indexes, (such as the index of the material of the columns and the index of the bulk material exterior to the columns). FIG. 4 shows the photonic band diagram for a hexagonal array of air-filled columns in a dielectric bulk material. One skilled in the art will appreciate that there is a range of photon frequencies, known as the photonic band gap, for which propagation in the plane of the photonic crystal is prohibited. This photonic band gap, denoted by region 19, is determined by the structure of the photonic crystal, especially by the parameters listed above.

A defect can be introduced into the crystalline structure for altering the propagation characteristics and localizing the allowed modes for an optical signal. For example, FIG. 5 shows a two-dimensional photonic crystal 20 made from a dielectric bulk material with a square lattice of air-filled columns 22 and a linear defect 24 consisting of a row of missing air-filled columns. The band diagram for this photonic crystal structure is shown in FIG. 6. The photonic band gap is denoted by the region 30, while a band of allowed guided modes associated with the defect is denoted by the very thin region 32. The exact position and shape of the region 32 on the graph of FIG. 6 depends upon the photonic crystal parameters. Physically, this means that while optical signals of a given frequency are prohibited from propagating in the bulk photonic crystal 20, they may propagate in the defect region 24. An optical signal, whether a pulse or a continuous wave, traveling in the defect region 24 may not escape into the bulk photonic crystal 20, and so is effectively wiaveguided in the defect region 24. For a given wavevector, the region 32 only encompasses a narrow band of frequencies. Optical signals of a given wavevector must have frequencies within this narrow band in order to be guided in the defect 24. In the theoretical case of the infinitely thick two-dimensional photonic crystal, light is not confined in the z-axis direction by the photonic crystal structure. While the defect in the above example is a constructed from a row of missing air-filled columns, other defect structures are possible. For example, a defect may consist of one or more columns of a different shape or size than those of the bulk photonic crystal.

Additionally, the crystal structure can be composed of several photonic crystal regions having different parameters, in which case the defect is located at the border between the two regions. Such a structure is shown in FIG. 7, in which the photonic crystal structure 40 has a first photonic crystal region 42 and a second photonic crystal region 44. In the example of FIG. 7, in the first region 42 the cylindrical columns have radius $R_1$ and are arranged with a pitch $P_1$. In the second region, the photonic crystal structure has different parameters, with a column radius of $R_2$ and a pitch of $P_2$. This photonic crystal also has a photonic bandgap, with the possibility of a defect mode for allowing propagation of an optical signal. Because of this defect mode phenomenon and its dependence on the photonic crystal parameters, it is possible to control the propagation of an optical signal in a defect waveguide by controlling the parameters associated with the photonic crystal regions.

Since an optical signal propagating in a defect waveguide is prohibited from propagating in the bulk photonic crystal, it must follow the waveguide, regardless of the shape of the defect waveguide. An advantage of such a structure is that waveguides with a very small bend radius on the order of several wavelengths or even less are expected to have a very low bend loss, since an optical signal is prohibited from escaping the defect waveguide and propagating in the surrounding photonic crystal. FIG. 8 shows the results of a simulation of propagation in a 2D photonic crystal wherein substantially all of the optical signal successfully navigates a 90° bend with a radius of curvature smaller than the wavelength of the optical signal. Likewise, waveguide splitters and combiners are expected to have low radiation losses. FIG. 9 shows a 180° splitter in which nearly 100% transmission is achieved with the optical signal from the input guide 60 perfectly split into the two branches 62 and 64. In this case, a pair of small columns was added in order to reduce the small fraction of light that was backreflected into the input guide 60.

In-plane confinement by a photonic crystal defect waveguide can be combined with refractive confinement in the dimension normal to the photonic crystal to provide a defect channel waveguide. This is most commonly achieved by providing a thin slab of a two-dimensional photonic crystal (known as a planar photonic crystal) having a defect waveguide with lower refractive index materials above and below the photonic crystal waveguide. For example, FIG. 10 shows the structure of a planar photonic crystal defect waveguide 70 with a core layer 71, an underclad layer 72, and an overclad layer 74, all of which include a photonic crystal structure defining the defect channel waveguide. As used herein, an effective refractive index of a material is defined as the volume average refractive index of that material. In order to provide vertical confinement, the effective refractive index of the core layer 71 is higher than the effective refractive indices of the underclad layer 72 and the overclad layer 74. This structure may be made by etching an array of columnar holes into a slab waveguide containing a core layer, an underclad layer, and an overclad layer.

An example of an alternative structure appears in FIG. 11. In this case, only the higher effective refractive index core layer 81 has the photonic crystal structure; the underclad 82 and the overclad 84 are homogeneous. In this structure, which may be fabricated by bonding a thin slab of material containing the 2D photonic crystal structure to a substrate, the substrate serves as the underclad, and the overclad is air. Alternative structures have been envisioned wherein a freestanding planar photonic crystal is clad on both sides by air, or wherein both the underclad and overclad are a dielectric material.

FIG. 12 shows another alternative structure, having both the core layer 90 and the underclad layer 92 patterned with a two dimensional photonic crystal structure, and a homogeneous overclad 91. This structure can be made by etching an array of columnar holes into a slab waveguide having an optically homogeneous core layer deposited onto a optically homogeneous underclad layer. In both of these alternative architectures, the upper cladding may be air, as it is in this example, or it may be a layer of dielectric material.

In all three architectures, an optical signal is constrained in the defect waveguide vertically by total internal reflection, and horizontally by the photonic band gap. Passive waveguiding has been predicted by optical simulations and demonstrated in experimental systems in all three architectures. Calculations for a planar photonic crystal waveguide have been described. One such calculation method uses a numerical solution of the full vector Maxwell equations, in which the electromagnetic modes are expanded in a sum of plane waves. This approach is well suited to periodic photonic crystals. When the physical system lacks periodicity, for example as in the z-direction of a bulk photonic crystal or the transverse direction of a defect waveguide, then a supercell is employed in which a periodic array of crystals or waveguides is considered. The artificial repeat distance of this supercell is kept large enough to avoid unwanted calculation artifacts. The supercell method is a standard approach that allows periodic band structure computer codes to solve nonperiodic systems. Solution of the full vector Maxwell equations is required, as the simpler scalar approximation gives incorrect results due to the large dielectric/air index. Propagation through sharp defect waveguide bends has also been predicted and experimentally demonstrated.

Active devices may be based on planar photonic crystal defect channel waveguides. For example, an actively controllable Y junction is shown in FIG. 13. The Y junction has an input waveguide 94, a first output waveguide 95, and a second output waveguide 96. The output waveguides are modified by the presence of controllable lattice sites 98 located in the regions 97 of the output waveguides near the branch point and comprising cylindrical columns formed of a ferrite material to which a variably controllable external electromagnetic field may be applied. The locations of the controllable lattice sites conform to the column and row positions of the surrounding lattice region and in effect form an extension of the lattice. Control of the controllable lattice sites 98 is effected such as to vary the refractive index of the ferrite material, and therefore the propagation characteristics of the defect waveguides. The presence of the controllable lattice sites can in effect be turned on or off in variable number to thereby variably control the effective apertures of the output waveguides 95 and 96. This is represented in FIG. 13 by showing only those controlled lattice sites 98 which are turned "on" and which in this example are shown only in the second output waveguide 96. The amount of optical signal coupled into the second output waveguide 96 is thereby controllable by setting the number of sites which are turned on, the remainder of the optical signal being diverted into the second waveguide 96. Active photonic crystal materials and devices with bandgaps in the near infrared, however, would be difficult to fabricate using ferrite materials.

It is also possible to externally control the propagation of an optical signal in a planar photonic crystal defect channel waveguide by varying the refractive index of the bulk material of the planar photonic crystal. The externally applied control may be one of a number of available options including the application of local heating, the injection of electrical current into a semiconductor bulk material, or other suitable optically or electromagnetically induced effects. The photonic crystal lattice is substantially unaffected by this control and continues to serve as a means of confining the optical signal within the waveguide so as to pass through the controlled dielectric region. These types of devices are unattractive in that the photonic crystal must be formed in a thermo-optically or electro-optically active material, limiting the choice of device materials and fabrication processes.

Accordingly, photonic crystal waveguide devices which can perform a wide variety of optical transformations and are amenable to a wide variety of materials and manufacturing processes are desired.

SUMMARY OF THE INVENTION

One aspect of the present invention is an optical device for controlling propagation of an optical signal, the optical signal including light of one or more wavelengths. The optical device includes a planar photonic crystal structure having a structural symmetry, the planar photonic crystal structure including columnar holes arranged in an array having a pitch; a defect waveguide formed in the planar photonic crystal structure; and a dimensional actuating device coupled to the planar photonic crystal structure, wherein the optical signal propagates in the defect waveguide, and actuation of the dimensional actuating device changes a dimension of the planar photonic crystal structure, such that the propagation of the optical signal is modified.

Another aspect of the present invention is an optical device for use with an optical signal including light of one or more wavelengths. The optical device includes a planar photonic crystal structure, the planar photonic crystal structure including a bulk material with columnar holes formed therethrough, the columnar holes being substantially parallel, the columnar holes having a columnar axis; a set of columnar rods, each rod being registered to one of the columnar holes of the planar photonic crystal structure; and an actuator, the actuator being coupled to the set of columnar rods, wherein actuation of the actuator moves the set of columnar rods along the columnar axis within the columnar holes of the planar photonic crystal structure.

Another aspect of the present invention is an optical device for use with an optical signal including light of one or more wavelengths. The optical device includes a planar photonic crystal structure, the planar photonic crystal structure including a bulk material with columnar holes formed therethrough, the columnar holes being substantially parallel, the columnar holes having a columnar axis; a cavity in fluid communication with a set of the columnar holes of the planar photonic crystal structure; and a microfluidic pump in fluid communication with the cavity, wherein actuation of the microfluidic pump moves a fluid within the cavity and the columnar holes, thereby changing the propagation of the optical signal in the planar photonic crystal structure.

The device of the present invention results in a number of advantages. Active planar photonic crystal defect waveguide devices may be designed and fabricated with well-defined guiding characteristics in all three dimensions, and may have modes with zero group velocity. The active planar photonic crystal defect waveguides may be fabricated by standard semiconductor manufacturing techniques. The devices of the present invention do not derive their activity from an active photonic crystal waveguide core, and so may be made from photonic crystals of any standard passive waveguide material. The devices of the present invention may affect various optical transformations, including attenuation, modulation, and switching, all with the reduced device size afforded by the efficiency of tight photonic crystal waveguide bends.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
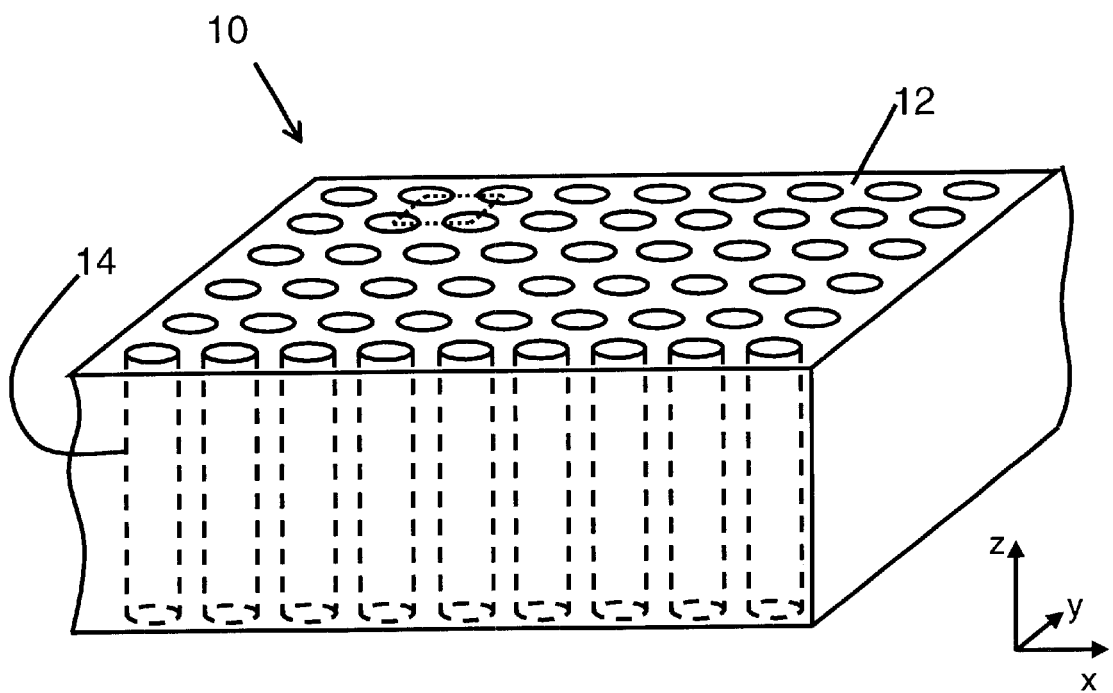
FIGS. 1, 2 and 3 are perspective views showing exemplary prior art two-dimensional photonic crystal structures.
Figure 2:
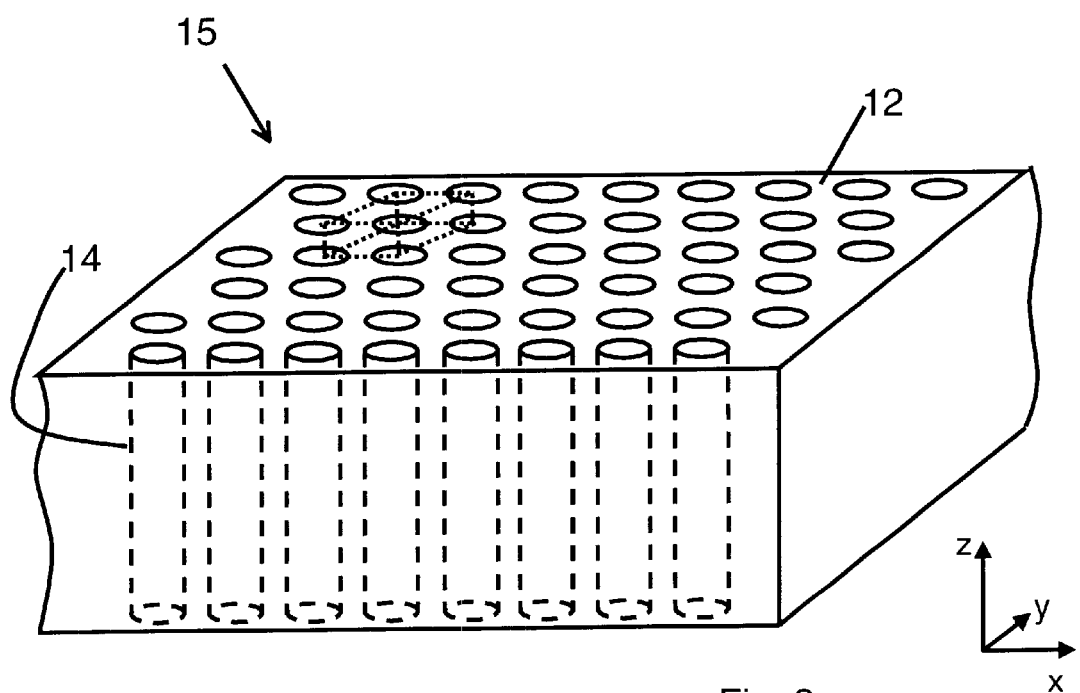
Figure 3:
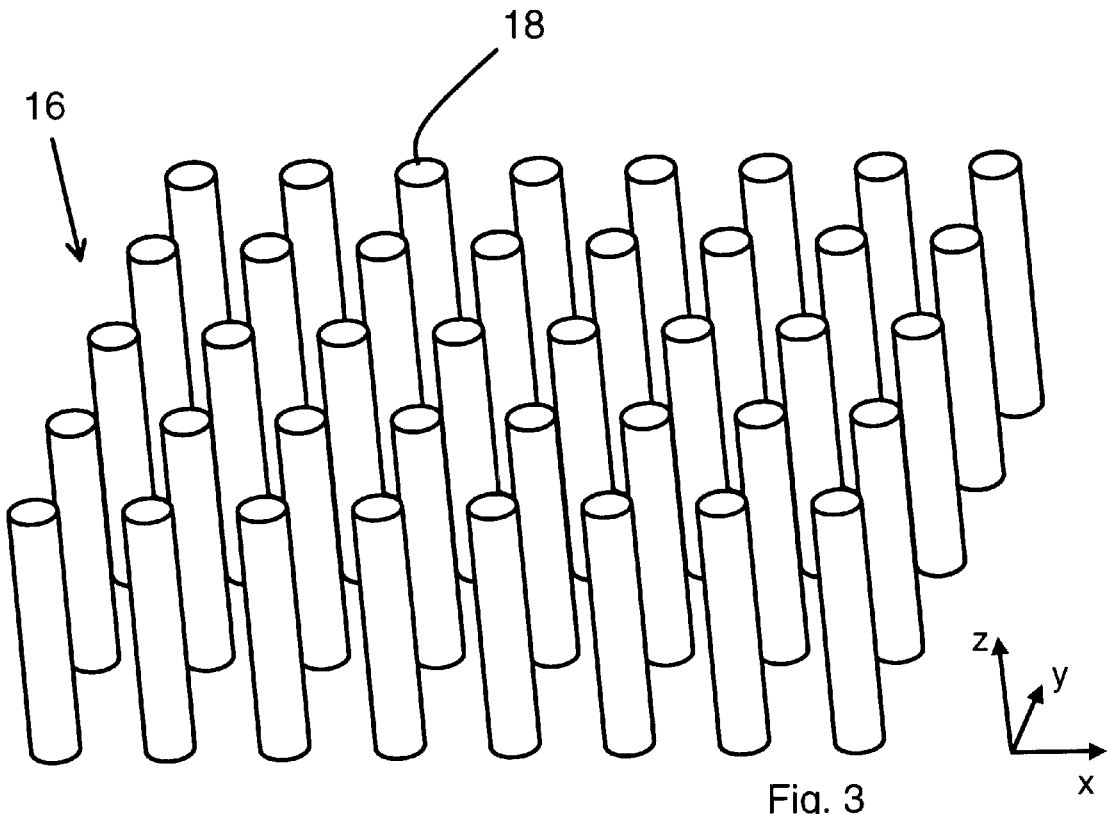
Figure 4:
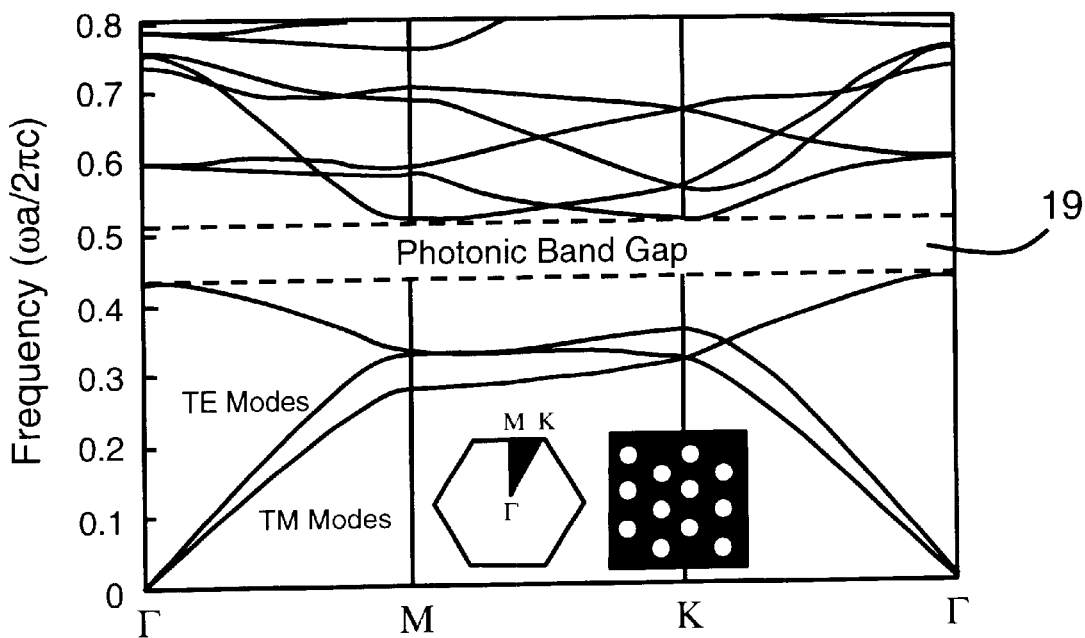
FIG. 4 is a graph showing the band structure of the exemplary prior art two-dimensional photonic crystal structure of FIG. 1.
Figure 5:
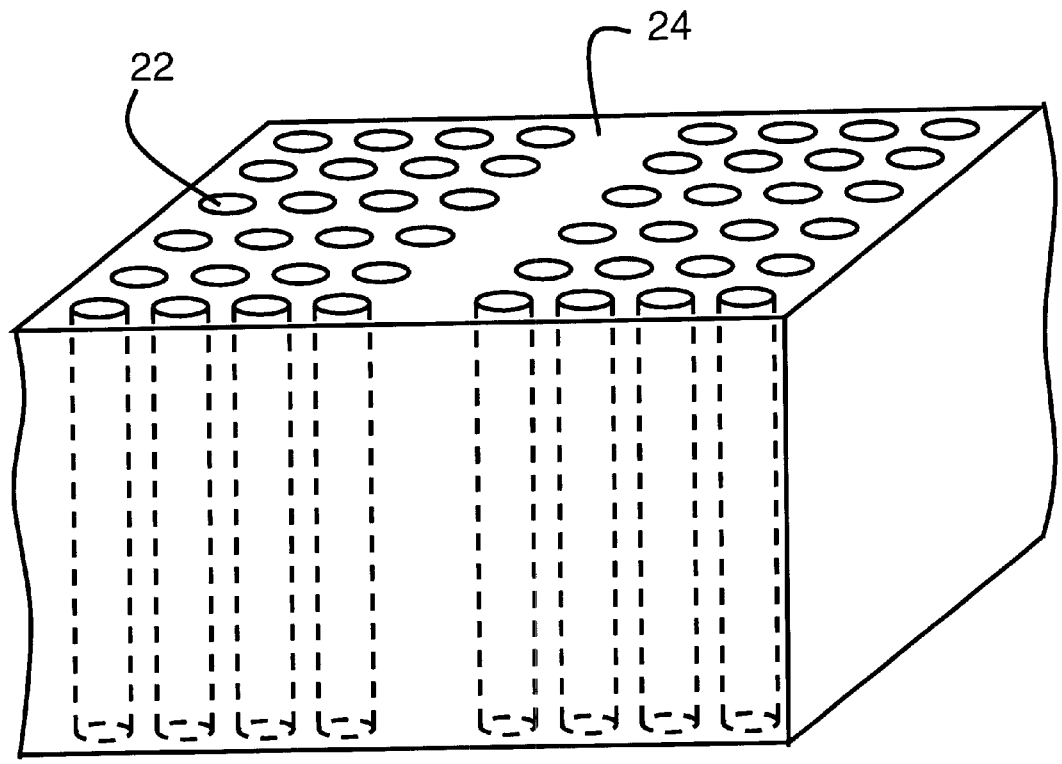
FIG. 5 is a perspective view showing an exemplary prior art two-dimensional photonic crystal structure with a linear defect.
Figure 6:
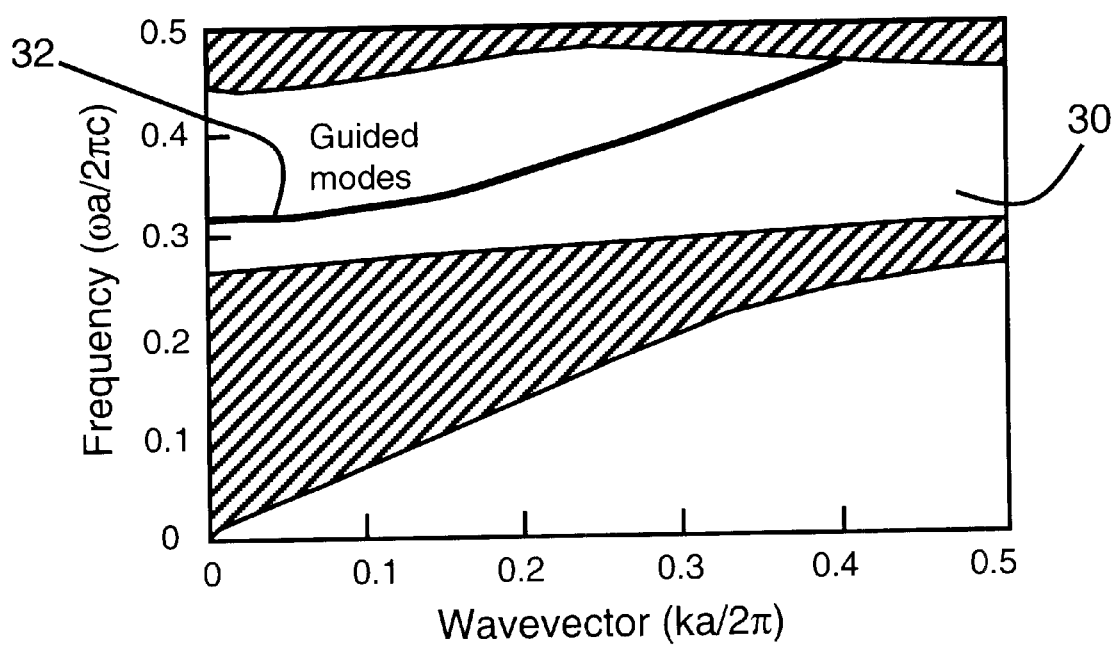
FIG. 6 is a graph showing the band structure of the exemplary prior art two-dimensional photonic crystal structure of FIG. 5.
Figure 7:
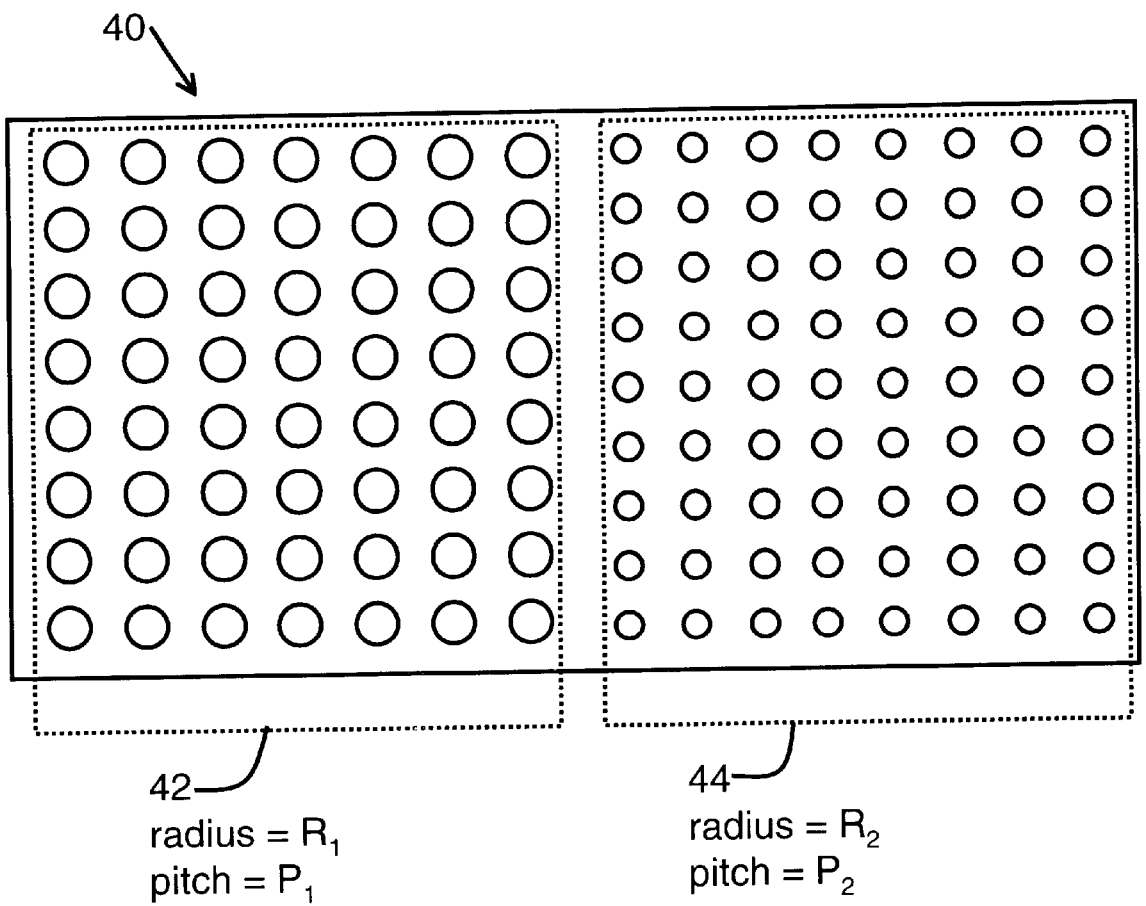
FIG. 7 is a perspective view showing exemplary prior art two-dimensional photonic crystal structures having two different photonic crystal regions separated by a linear defect waveguide.
Figure 8:
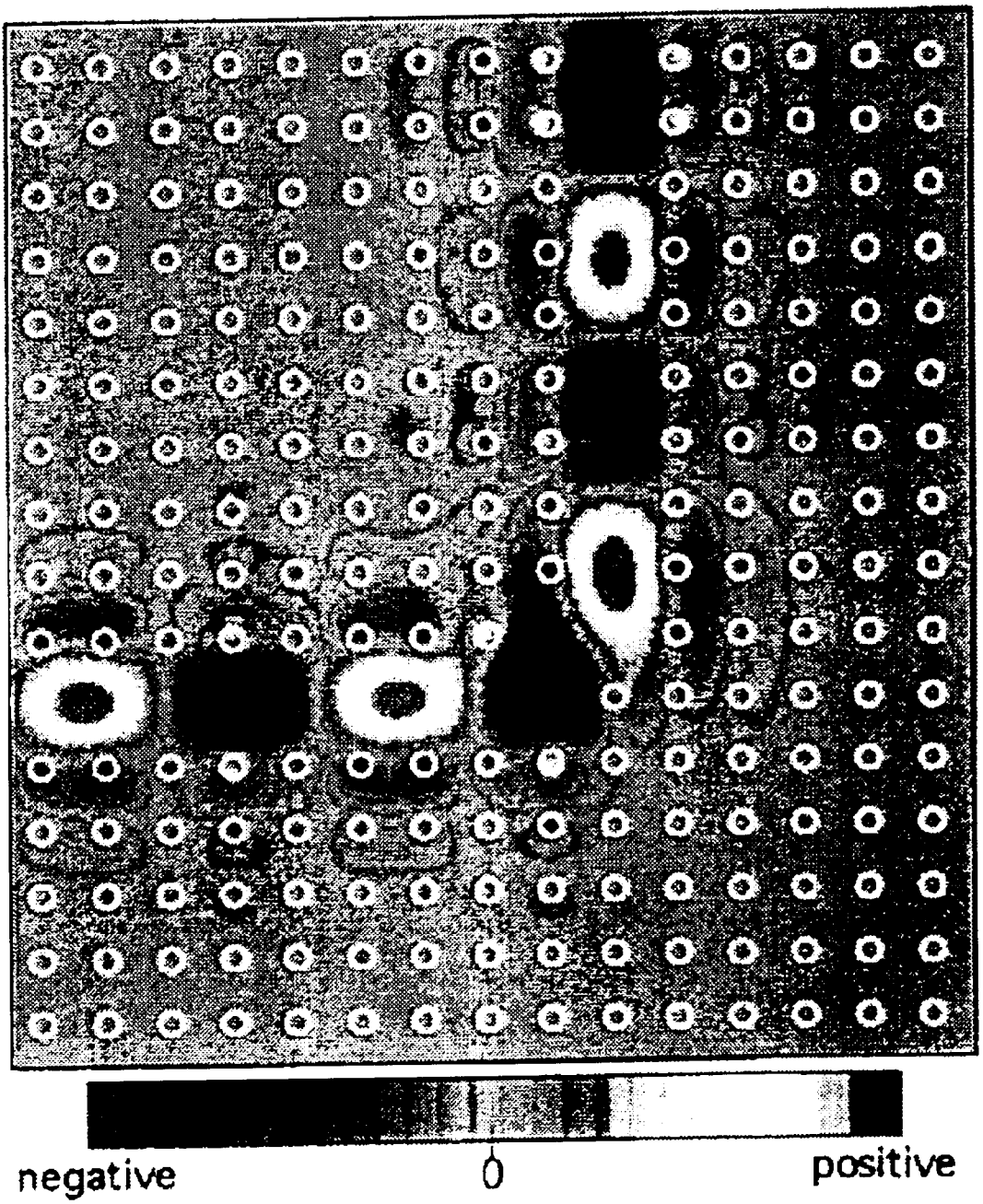
FIG. 8 is a diagram showing propagation of an optical signal through a sharp 90° bend in a prior art two-dimensional photonic crystal defect waveguide.
Figure 9:
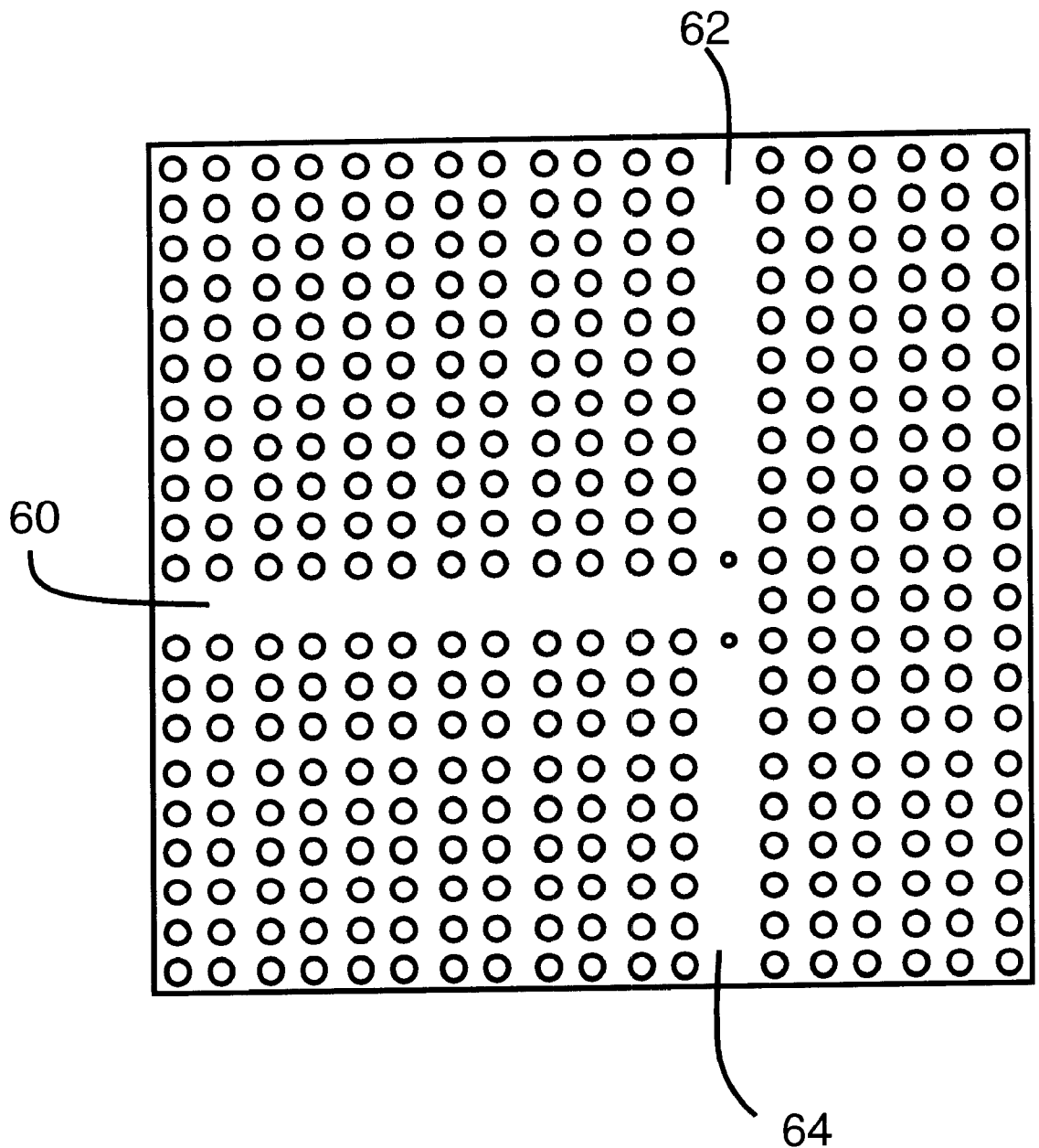
FIG. 9 is a top view of a 180° splitter in a prior art two-dimensional photonic crystal defect waveguide.
Figure 10:
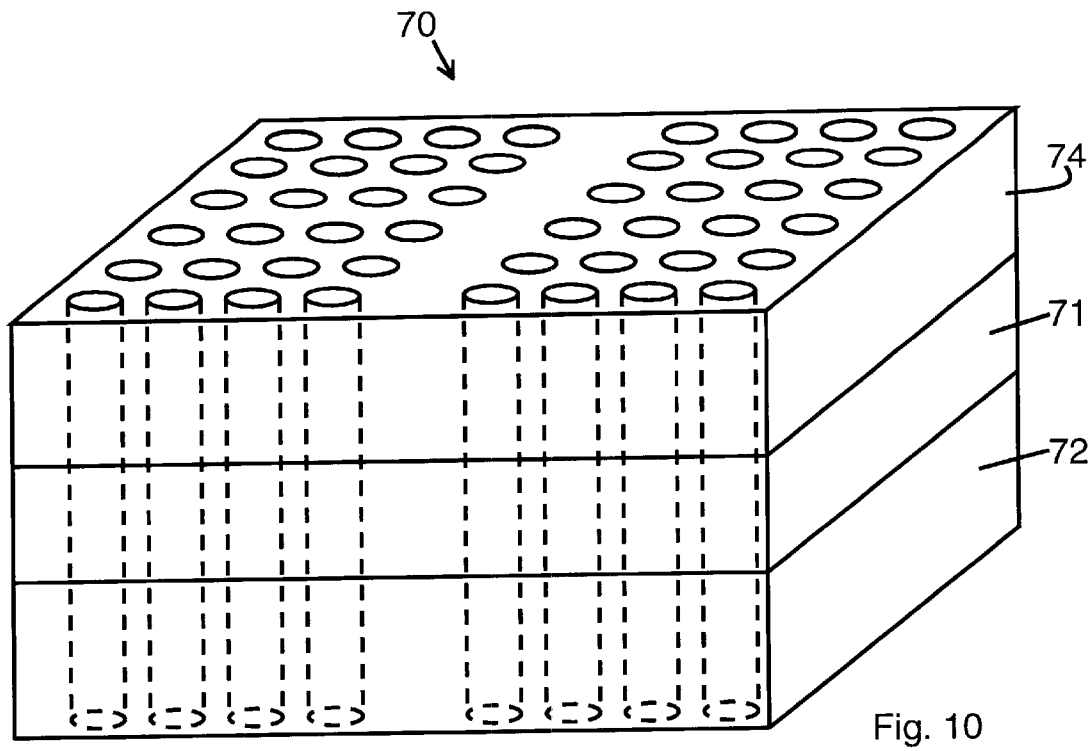
FIG. 10 is a perspective view of a prior art planar photonic crystal defect waveguide with a planar photonic crystal core and photonic crystal underclad and overclad layers.

Reference will now be made in detail to the present preferred embodiments of the invention, examples of which are illustrated in the accompanying drawings. Wherever possible, the same reference numerals will be used throughout the drawings to refer to the same or like parts.

Figure 18:
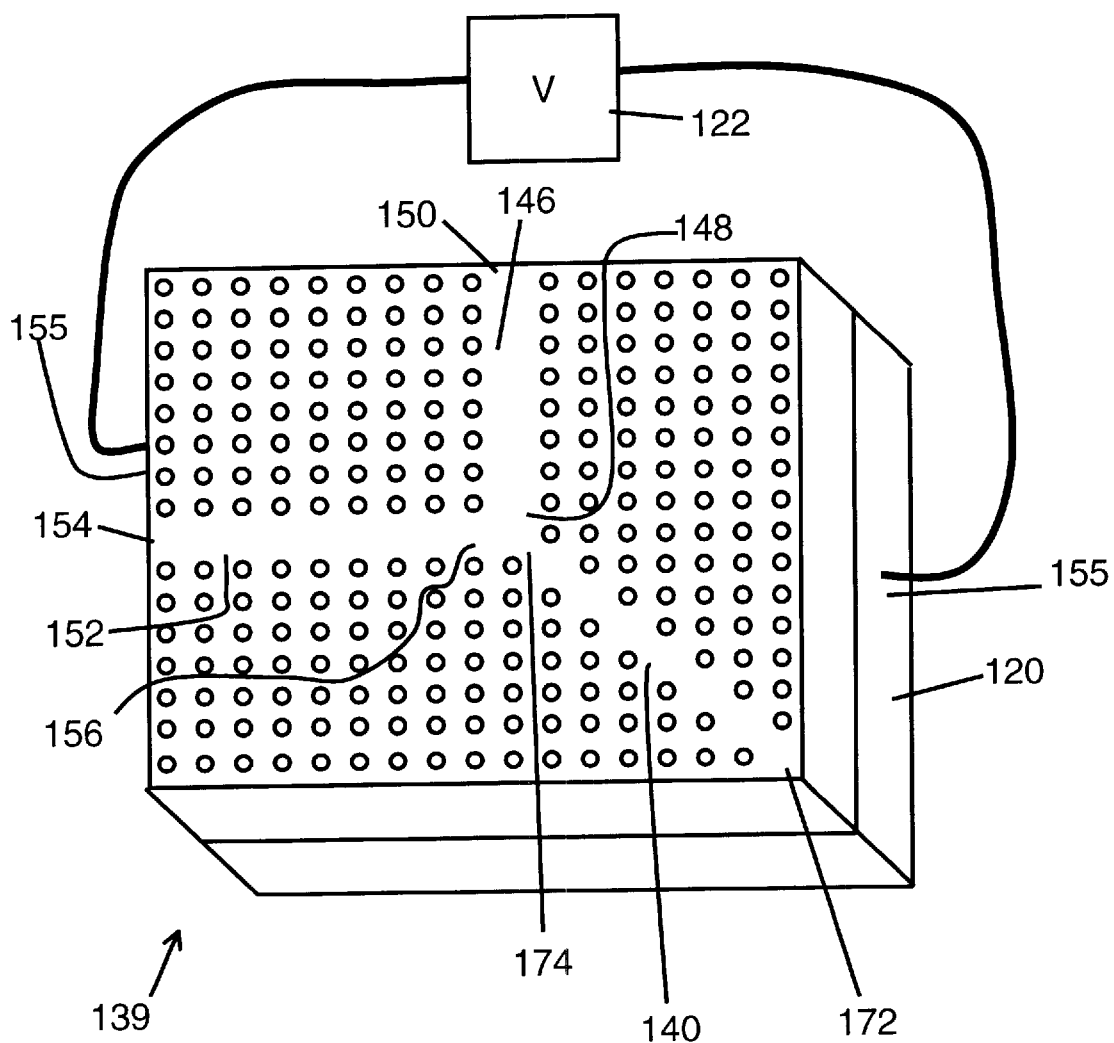
FIG. 18 is a top perspective view of an exemplary 1×2 switch of the present invention.

Turning now to FIG. 18, an exemplary embodiment of a 1×2 switch 139 is shown. Switch 139 includes an input waveguide 140 and first and second output waveguides 146 and 152 respectively. An advantage of switch 139 is that the first output waveguide 146 and the second output waveguide 152 can be formed at a 90 degree angle, and optical signals can be propagated along either of the waveguides 146, 152 with very low losses. As such, switch 139 allows for the creation of optical devices having a very small size.

Figure 13:
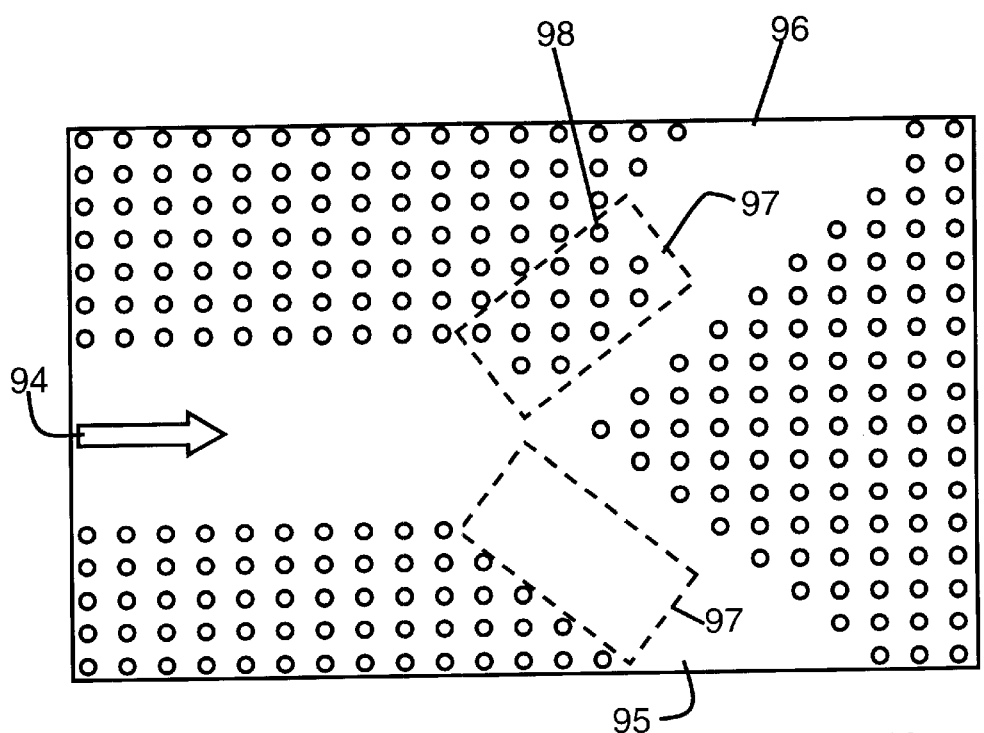
FIG. 13 is a top view of a prior art active planar photonic crystal defect waveguide Y junction.

The technique for switching a light signal involves dynamically changing the dimensions of the structure of the photonic crystal. As described above, the parameters (geometry, index) of the photonic band gaps of a given photonic crystal come from its geometry and its dimensions. For example, in a two-dimensional photonic crystal, the lattice can be either square or hexagonal, and can be stretched in one direction or another. More specifically, it is contemplated that a voltage V can be applied to the edges 155 of the switch structure 139 in order to compress or stretch the structure, thereby changing its geometry and/or dimensions. FIG. 18 shows the switch structure 139 at rest with no voltage applied to the edges 155. FIG. 13C shows a voltage being applied along the edges 155 of the switch structure 139. One technique for applying the voltage V is via a piezoelectric device. Therefore, when no voltage is applied, light can propagate along the first output waveguide 146 and when a voltage is applied, light can propagate along the second output waveguide 152.

To further clarify the invention, alternative embodiments of the inventive device disclosed above are described hereinbelow. As the person of skill in the art will appreciate, the inventive concept of altering the optical properties of a planar photonic crystal structure by dynamically changing the dimensions of the planar photonic crystal structure may be embodied in a number of ways. In one embodiment of the current invention, at least one dimension of a planar photonic crystal having a defect waveguide is changed by a dimensional actuating device. As used herein, a dimensional actuating device is a device which can be controlled to alter the length of an object in at least one dimension. Changing a dimension of the photonic crystal will change the parameters of the photonic crystal, and therefore will modify the propagation of an optical signal through the device. Calculations for planar photonic crystal waveguide structures have been described in Kuchinsky et al., "3D localization in a channel waveguide in a photonic crystal with 2D periodicity," Optics Communications 175, p. 147–152 (2000), which is hereby incorporated by reference.

Figure 14:
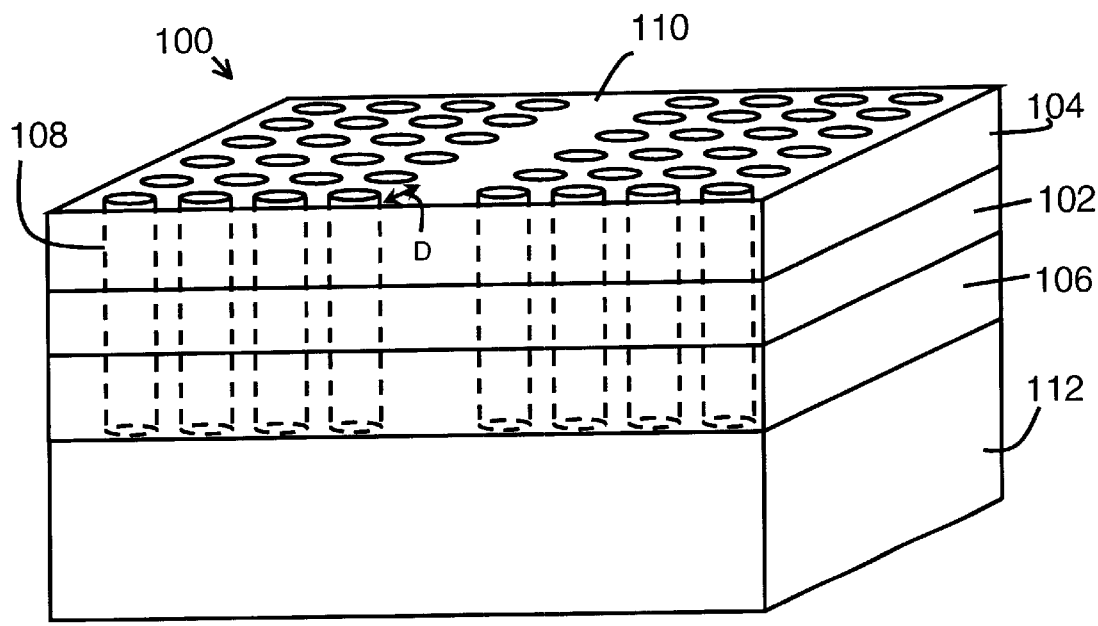
FIG. 14 is a perspective view of a dimensionally unactuated device of the present invention.
Figure 15:
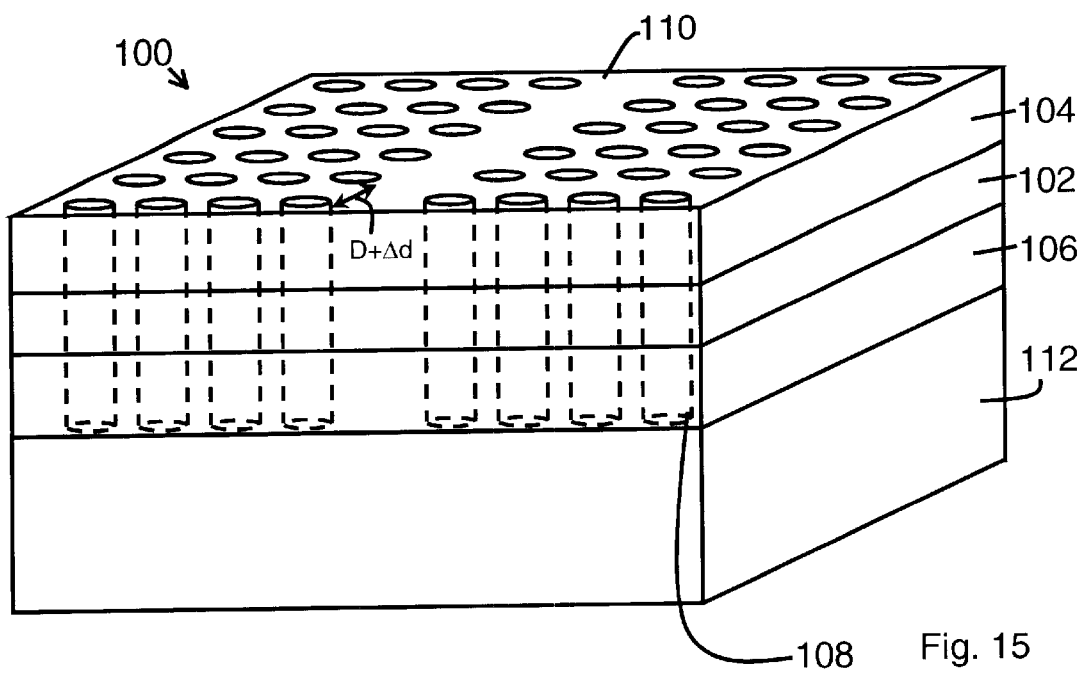
FIG. 15 is a perspective view of a dimensionally actuated device of the present invention.

An exemplary planar photonic crystal device is shown in FIG. 14. The planar photonic crystal waveguide 100 includes a core layer 102, an overclad layer 104, and an underclad layer 106. The overclad layer 104 and the underclad layer 106 have refractive indices lower than that of the core layer 102. In this example, all three layers are patterned with the photonic crystal structure, having columns 108 disposed in a square array. The photonic crystal structure defines a defect waveguide 110. An optical signal traveling in the defect waveguide is confined in the horizontal direction by the photonic crystal structure, and in the vertical direction by the lower refractive index cladding layers. A dimensional actuating device 112 is coupled to the bottom of the underclad layer 106. In FIG. 14, the dimensional actuating device is in an unactuated state, and the planar photonic crystal has square symmetry and a pitch of D. In FIG. 15, the dimensional actuating device is in an actuated state. The square symmetry of the photonic crystal structure is destroyed, and the photonic crystal now has a pitch in the dimension of actuation of D+Δd. The pitch in the dimension perpendicular to actuation remains D. As one of skill in the art will realize, these changes in the parameters of the photonic crystal will affect the photonic bandgap of the photonic crystal, the band of allowed guided modes of the defect waveguide, and the propagation of an optical signal in the defect waveguide.

The planar photonic crystal waveguides of the present invention may be constructed from a variety of materials. For example, the bulk materials may be any material substantially transparent to the wavelengths of the optical signal. For example, the planar photonic crystal bulk material may be doped silica, undoped silica, silicon, a polymeric organic material, an organic/inorganic hybrid material, an inorganic glass (especially chalcogenide glass), a II-V semiconductor material such as, for example, gallium arsenide, or any other suitable materials known to one of skill in the art. The difference in refractive index between the core and the cladding layers may be achieved by using two substantially different materials, or by selectively doping similar materials, or by other methods known to the skilled artisan. The columns 108 may be filled with air, or may be filled with another material. Preferably, the material of the columns has a refractive index that is substantially different than the bulk photonic crystal material. The geometry of the array of columns may be hexagonal, square, triangular, rectangular, or more complex, depending on the desired in-plane photonic band gap.

Figure 11:
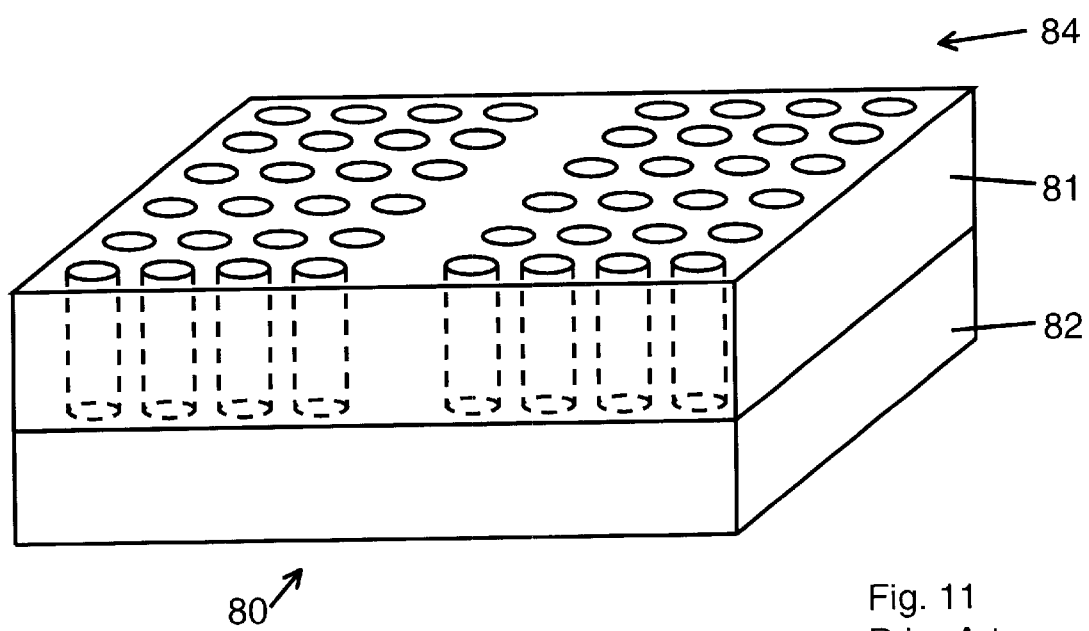
FIG. 11 is a perspective view of a prior art planar photonic crystal defect waveguide with planar photonic crystal core and homogenous underclad and overclad layer.
Figure 12:
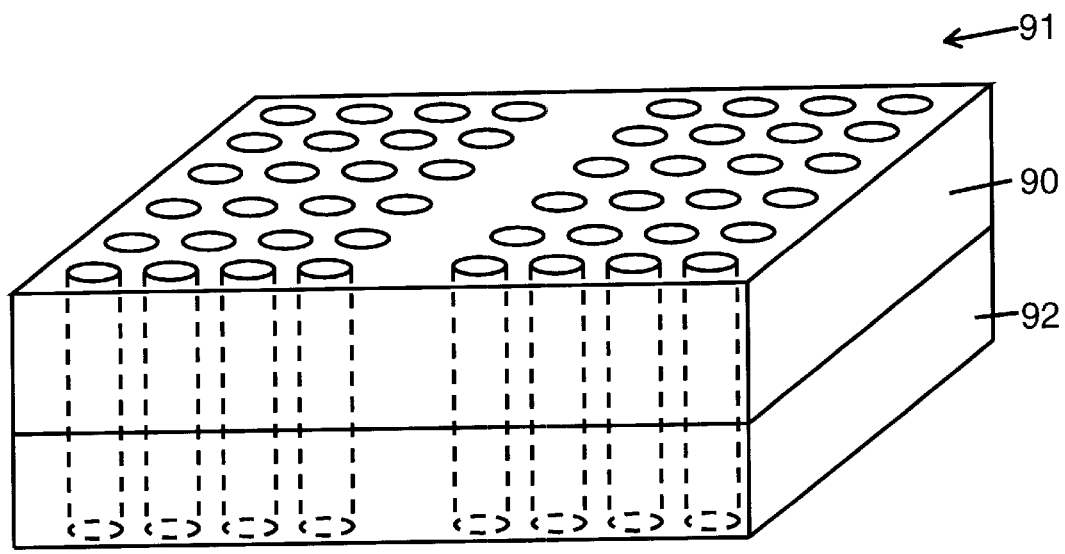
FIG. 12 is a perspective view of a prior art planar photonic crystal defect waveguide with planar photonic crystal core and underclad layer, and a homogeneous overclad layer.

The planar photonic crystal may be made by any method used in the art, such as photolithographic patterning of a slab waveguide followed by etching. As the skilled artisan will recognize, alternative architectures may be used in the invention described herein. For example, alternative planar photonic crystal waveguide structures, such as, for example, those described in connection with FIGS. 11 and 12, may be used. For example, the core layer may be a free-standing layer of silicon, and the cladding layers may be air.

Figure 16:
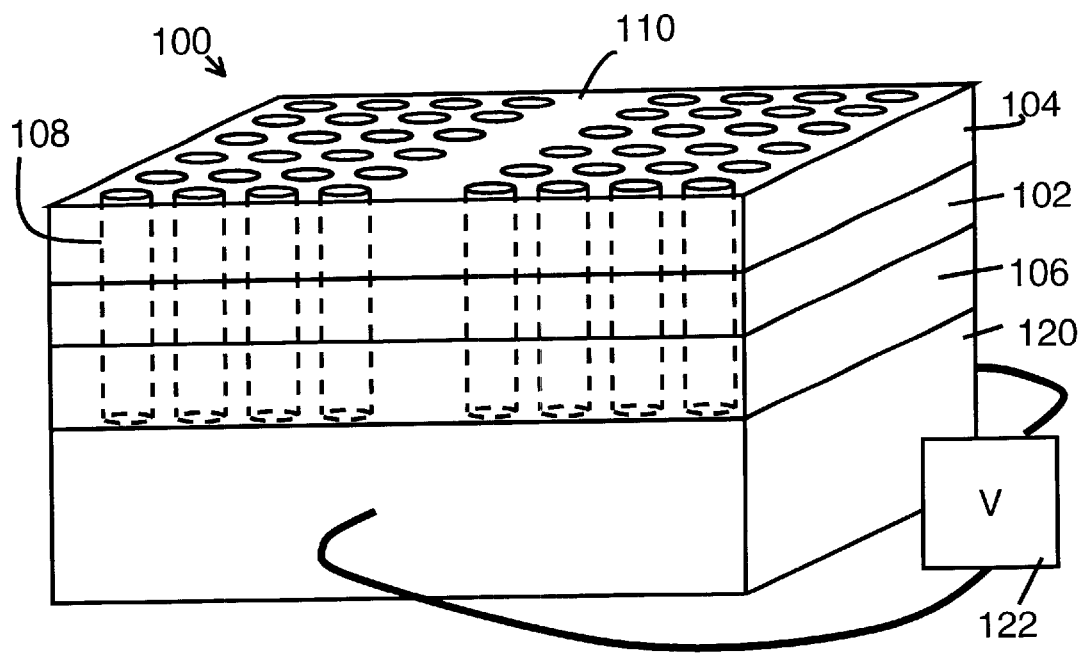
FIG. 16 is a perspective view of a device including a piezoelectric dimensional actuating device.

As described above, this embodiment of the invention includes a dimensional actuating device. The dimensional actuating device is coupled to the planar photonic crystal waveguide, and is controllable to change at least one dimension of the planar photonic crystal waveguide. The dimensional actuating device may be, for example, a piezoelectric device or a mechanical device. For example, as shown in FIG. 16, the planar photonic crystal waveguide may be formed on a piezoelectric substrate 120. The piezoelectric substrate is coupled to a variable voltage supply 122. Application of a voltage across the substrate causes the substrate to contract in the direction of the applied field, decreasing the length of the planar photonic crystal waveguide along that axis. Thus, the length of the device, and therefore propagation of the optical signal through the device is controlled by the application of a voltage by the variable voltage supply 122.

Figure 17:
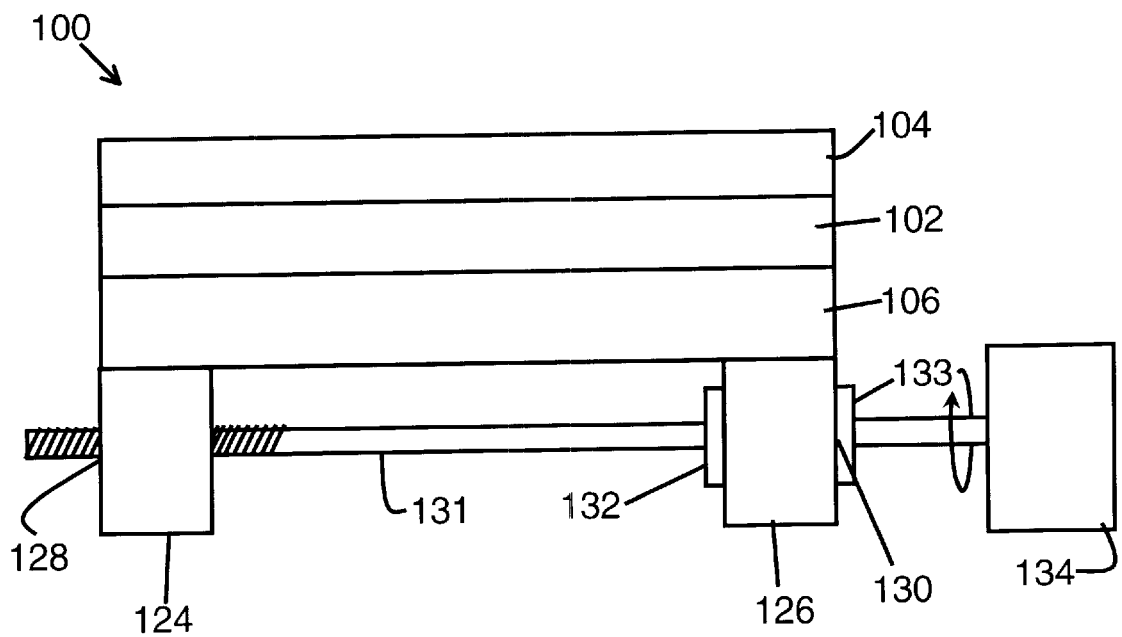
FIG. 17 is a side view of a device including a mechanical dimensional actuating device.

A side view of a mechanical dimensional actuating device is shown in FIG. 17. The edges of the planar photonic crystal waveguide 100 are attached to bars 124 and 126. Bar 124 has a threaded hole 128 formed therethrough, and bar 126 has an unthreaded hole 130 formed therethrough. A screw 131 extends through the unthreaded hole 130 and engages the threaded hole 128. Screw 131 has a collar 132 and a cap 133 which engage bar 126. Screw 131 is coupled to a rotating actuator 134. Rotation of the actuator 134 turns screw 131, which moves bar 126 relative to bar 124, thereby changing the dimension of the planar photonic crystal waveguide 100.

Since the device of this embodiment operates by changing a dimension of the planar photonic crystal, the planar photonic crystal waveguide must be able to be reversibly deformed by the dimensional actuating device. The magnitude of the necessary deformation depends on the design and desired functionality of the device, and may be quite small. Preferably, the layers 102, 104 and 106 are only as thick as is necessary to perform their optical function. Use in the core and cladding layers of a material with a glass transition temperature below room temperature may also increase the deformability of the planar photonic crystal waveguide.

Figure 19:
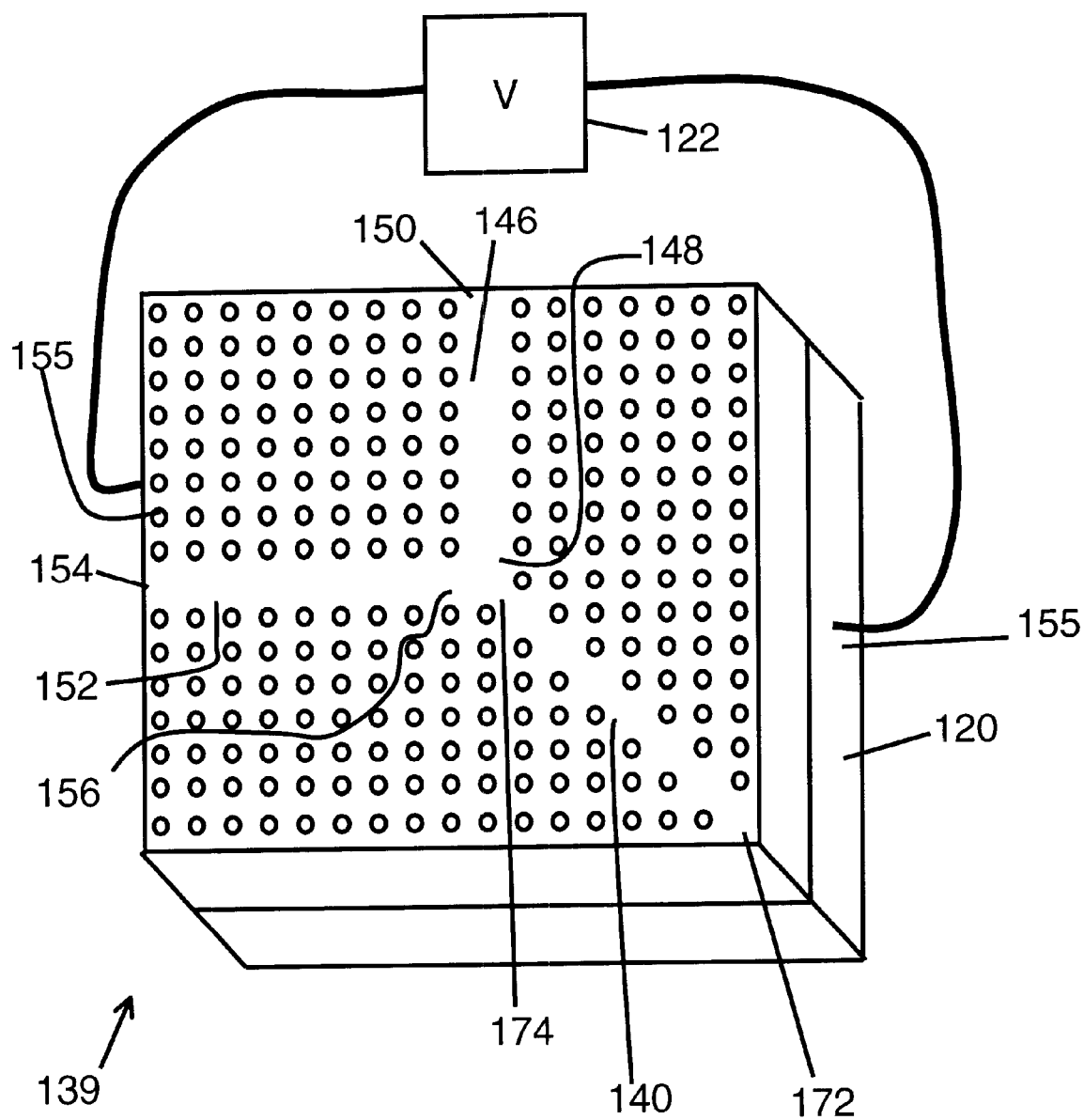
FIG. 19 is a top perspective view of the switch of FIG. 21 when actuated.

An exemplary embodiment of a 1×2 switch in accordance with this invention is shown in top view in FIGS. 18 and 19. The defect waveguide includes an input waveguide segment 140 having an input end 142 and a junction end 144; a first output waveguide segment 146 having a junction end 148 and an output end 150; and a second output waveguide segment 152 having a junction end 154 and an output end 156. The junction ends 144, 148 and 154 are coupled to each other. The planar photonic crystal waveguide is built on a piezoelectric substrate 120, which is coupled to variable voltage supply 122. In this exemplary embodiment, the output waveguide segments 146 and 152 are at an angle of about 90° to one another. In the unactuated state, shown in FIG. 18, the photonic crystal parameters are such that an optical signal entering the device at the input end 142 of the input waveguide segment 140 is prohibited from propagating in the second output waveguide segment 152, and allowed to propagate in the first output waveguide segment 146, and therefore emerges from the device at output end 150 of the first output waveguide segment 146. In FIG. 19, the piezoelectric substrate coupled to the variable voltage supply is actuated, contracting the planar photonic crystal waveguide in the direction of the applied voltage. This contraction changes the photonic crystal parameters, such that the optical signal is now prohibited from propagating in the first output waveguide segment 146, and allowed to propagate in the second output waveguide segment 152, and therefore emerges from the device at output end 156 of the second waveguide segment 152. Thus, actuation of the dimensional actuation device effects switching from the first output waveguide segment to the second output waveguide segment. As this actuation causes complete switching, the dimensional actuating device is considered to be actuated to a fully switched state.

As the person of skill in the art will appreciate, the dimensional actuating device of the 1×2 switch described above may be actuated to only a partially switched state, thereby allowing a fraction of the optical signal to emerge from output end 156 of the second output waveguide segment 152, and the remainder of the optical signal to emerge from output end 150 of the first output waveguide segment 146. The distribution of the optical signal between the first output waveguide segment and the second output waveguide segment will depend on the degree of actuation of the dimensional actuating device. Thus, the device described above may be used as a variable 1×2 switch.

Figure 20:
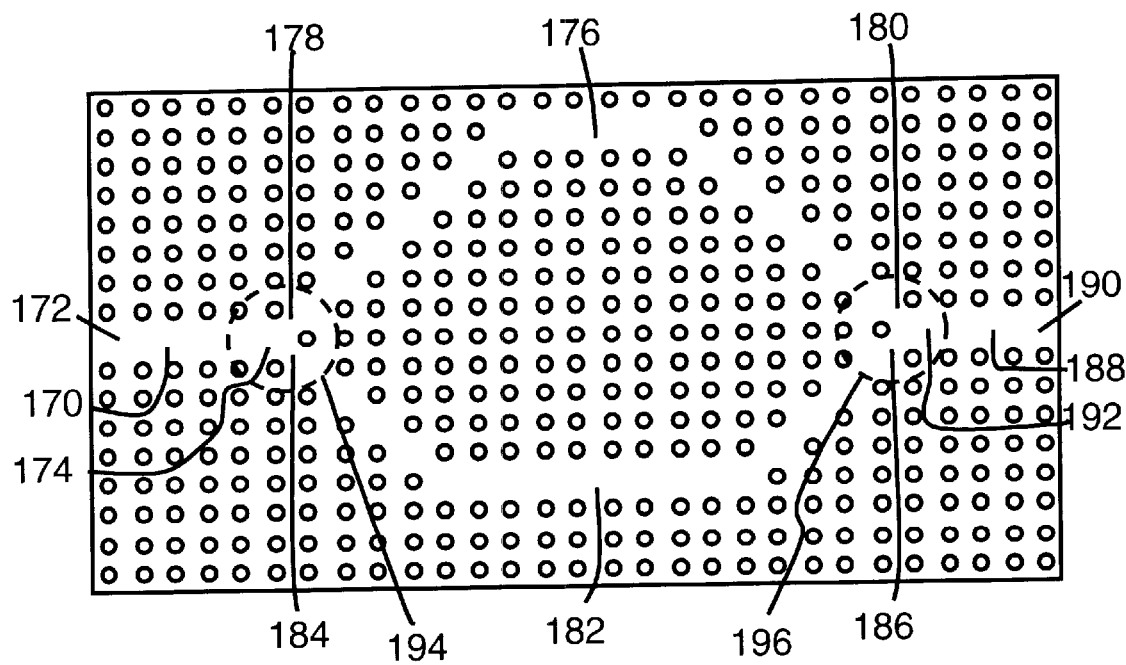
FIGS. 20 and 21 are top views of Mach-Zehnder interferometer devices constructed in accordance with the present invention.

An exemplary embodiment of a Mach-Zehnder interferometer in accordance with the present invention is shown in FIG. 20. In this embodiment, the defect waveguide includes an input waveguide segment 170 having an input end 172 and a splitter end 174; a first arm waveguide segment 176 having a splitter end 178 and a combiner end 180; a second arm waveguide segment 182 having a splitter end 184 and a combiner end 186; and an output waveguide segment 188 having a combiner end 190 and an output end 192. The splitter ends 174, 178 and 184 are coupled to one another in a splitting region 194. Similarly, the combiner ends 180, 186 and 190 are coupled to one another in a combining region 196. The planar photonic crystal waveguide is built on a piezoelectric substrate, which is coupled to a variable voltage supply (not shown). The piezoelectric substrate is configured to be actuable along the axis in the plane of the photonic crystal waveguide and perpendicular to the arm waveguide segments 176 and 182. In the embodiment shown in FIG. 20, the first arm waveguide segment 176 has a different length than the second arm segment 182.

An optical signal entering the device at the input end 172 of the input waveguide segment 170 will be split at splitting region 194, with a portion of the optical signal propagating through the first arm waveguide segment 176, and the rest of the optical signal propagating through the second arm waveguide segment 182. Preferably, the optical signal is split substantially equally between the two arm waveguide segments. The optical signals are recombined at combining region 196, and exit the device at output end 192 of the output waveguide segment 188. As the device is asymmetric, a change in dimension perpendicular to the arm waveguide segments will effect an optical signal propagating in the first arm waveguide segment differently than it will effect an optical signal propagating in the second arm waveguide segment. The optical signal emerging from the combiner end 180 of the first arm waveguide segment 176 and the optical signal emerging from combiner end 186 of the second arm waveguide segment 182 will be in phase, partially out of phase, or completely out of phase with one another, depending on the degree of actuation of the dimensional actuating device. Thus, actuation of the dimensional actuating device may be used to control the intensity of the recombined optical signal emerging from the device at output end 192 of the output waveguide segment 188.

Figure 21:
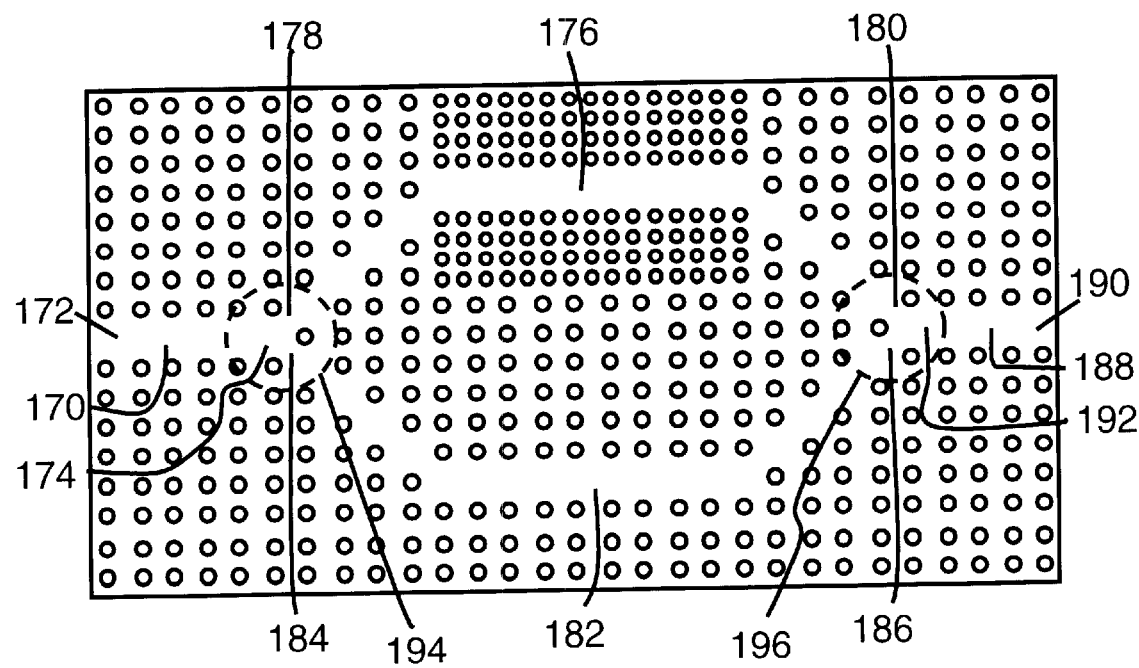

In an alternative embodiment of a Mach-Zehnder interferometer, shown in FIG. 21, the first waveguide arm segment 176 and the second waveguide arm segment 182 are defined by planar photonic crystal structures having different parameters. For example, the first waveguide arm segment 176 is defined by a first planar photonic crystal structure, having a column radius of $r_1$ and a pitch of $p_1$. In this example, the first planar photonic crystal structure also defines the input waveguide segment 170 and the output waveguide segment 188. The second arm waveguide segment 182 is defined by a second planar photonic crystal structure, different from the first planar photonic crystal structure, and having a column radius of $r_2$ and a pitch of $p_2$. As described above, an optical signal propagating through the first arm waveguide segment 176 will be effected differently than an optical signal propagating through the second arm waveguide segment 182, depending on the degree of actuation. Thus, actuation of the dimensional actuating device may be used to control the intensity of the recombined optical signal emerging from the device at output end 192 of the output waveguide segment 188.

Figure 22:
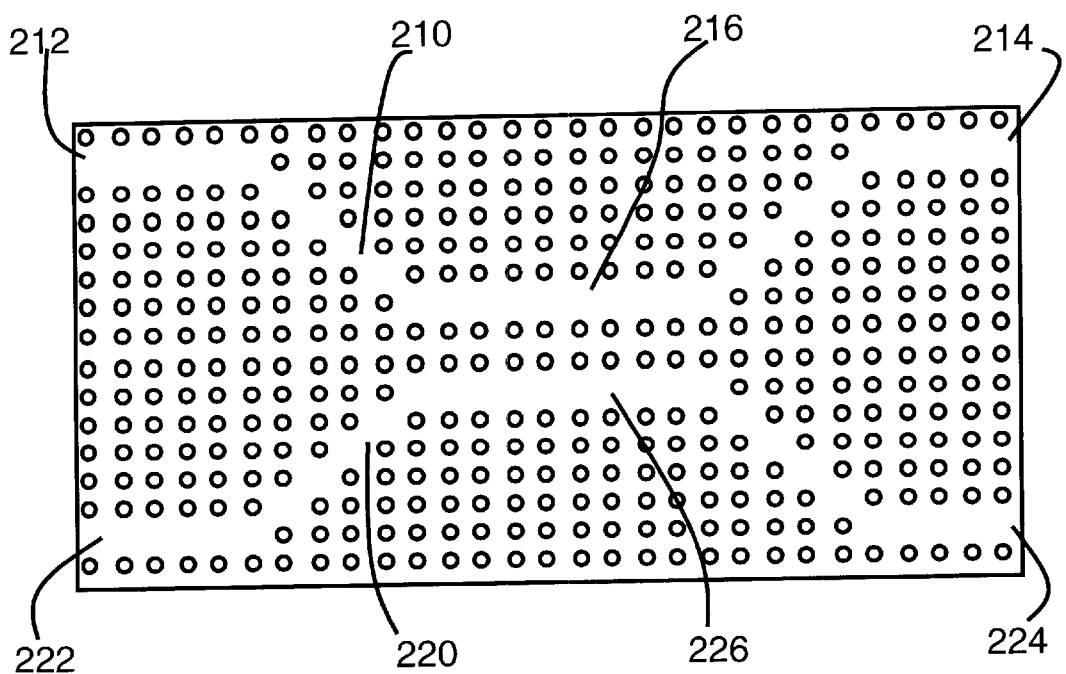
FIG. 22 is a top view of a directional coupler device constructed in accordance with the present invention.

FIG. 22 depicts an example of a directional coupler constructed in accordance with the present invention. In this example, the defect waveguide includes a first waveguide segment 210, having an input end 212, an output end 214, and a coupling region 216; and a second waveguide segment 220, having an input end 222, an output end 224, and a coupling region 226. The two waveguide segments are close enough to one another to evanescently couple in their coupling regions 216 and 226, and substantially uncoupled otherwise. The planar photonic crystal waveguide is built on a piezoelectric substrate, which is coupled to a variable voltage supply (not shown). The piezoelectric substrate is configured to be actuable along the axis in the plane of the photonic crystal waveguide and parallel to the coupling regions 216 and 226 of the waveguide segments. Actuation of the dimensional actuating device will alter the coupling ratio of the directional coupler, and will change the distribution of an optical signal between the output end 214 of the first waveguide segment 210 and the output end 224 of the second waveguide segment 220.

For example, in an exemplary embodiment of the device, an optical signal entering the device through input end 212 of first waveguide segment 210 is completely coupled into the second waveguide segment 220, and emerges from its output end 224, if the dimensional actuating device is unactuated. When the dimensional actuating device is actuated to a fully switched state, the optical signal exits the coupling region through the first waveguide segment 210, and emerges from its output end 214. Controlled actuation of the dimensional actuating device to a partially switched state allows for the control of the distribution of the optical signal between the output end 214 of the first waveguide segment 210 and the output end 224 of the output end of the second waveguide segment 220.

Figure 23:
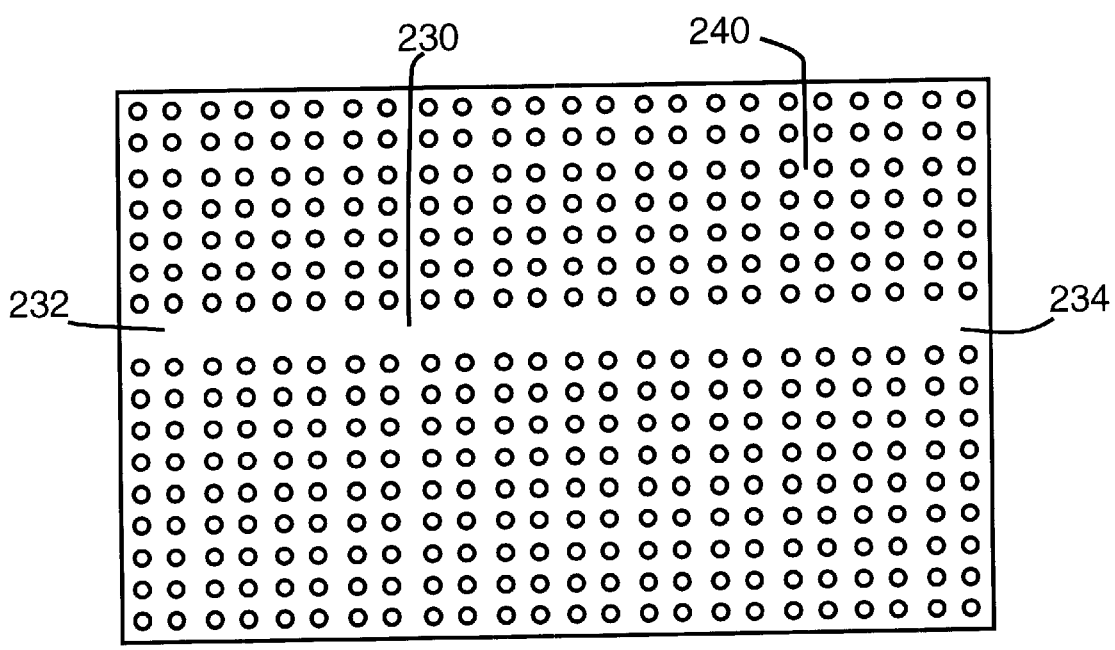
FIG. 23 is a top view of a variable attenuator device constructed in accordance with the present invention.

An exemplary embodiment of a variable optical attenuator in accordance with the present invention is shown in FIG. 23. The defect waveguide includes a waveguide segment 230, with an input end 232 and an output end 234. In an unactuated state, the optical signal is prohibited from propagating in the bulk planar photonic crystal 240, and is thereby confined to the defect waveguide. Thus, the optical signal emerges substantially unattenuated from the output end 234 of the waveguide segment 230. Actuation of the dimensional actuating device perturbs the band structure of the planar photonic crystal, and allows a fraction of the optical signal to couple into the bulk photonic crystal, thereby attenuating the optical signal emerging from the output end 234 of the waveguide segment 230. As the person of skill in the art will appreciate, the degree of attenuation is controlled by the magnitude of the actuation as well as by the structure of the planar photonic crystal.

Figure 24:
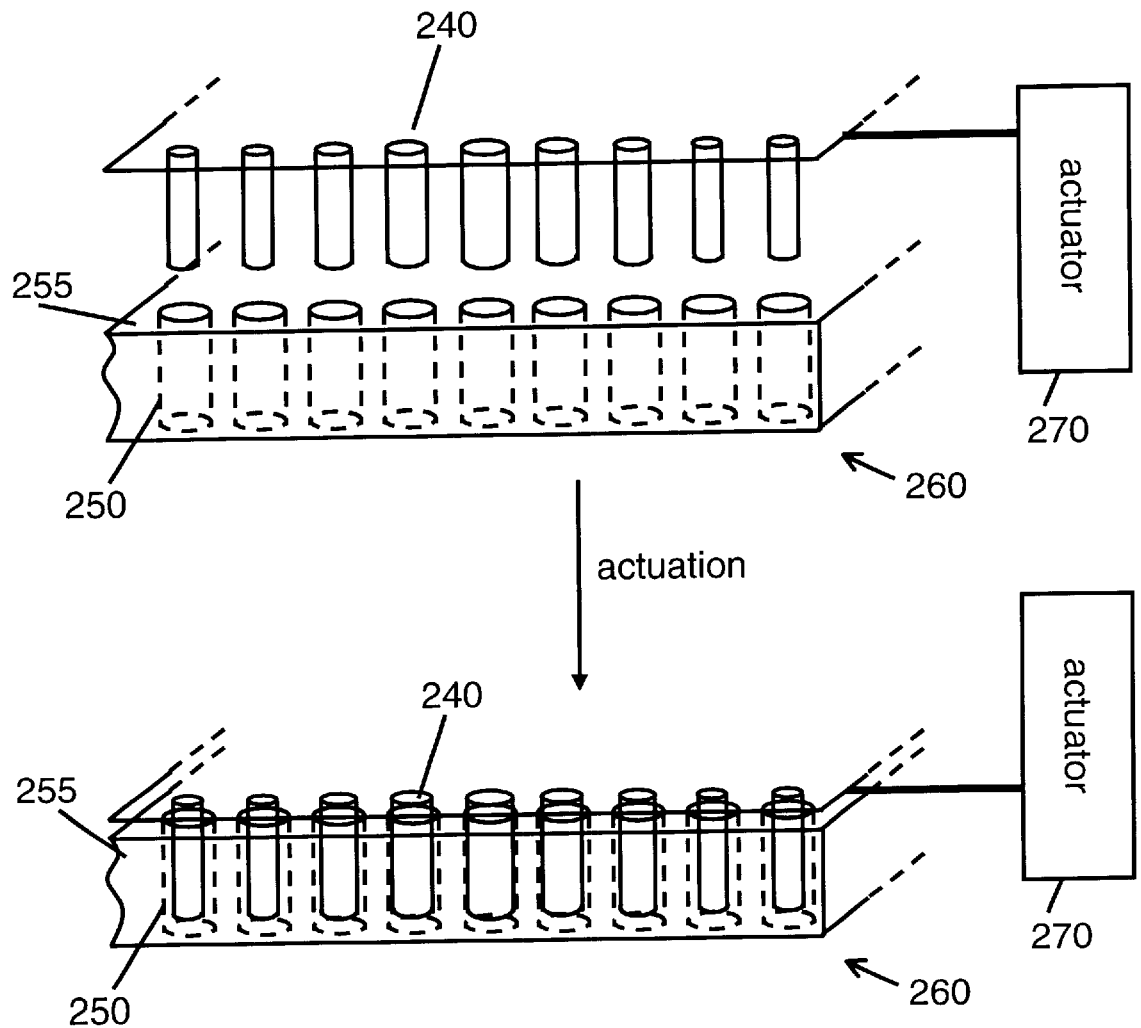
FIG. 24 is a perspective view of an actuated rod device of the present invention.

In another preferred embodiment of the invention, the properties of a planar photonic crystal structure are modified by the insertion of a material into the columnar holes forming the planar photonic crystal structure. For example, as illustrated in side view in FIG. 24, the optical properties of a planar photonic crystal structure may be altered by the actuation of a set of columnar rods 240 into the columnar holes 250 forming the planar photonic crystal structure in the bulk material, or background matrix 255. Note that in FIG. 24, only one row of columnar holes is shown for clarity. Each rod of the set of columnar rods is registered to one of the columnar holes. The set of rods is coupled to an actuator 270, which is configured to insert and remove the rods from the holes. Insertion of the rods into the holes increases the effective index of the holes. The magnitude of this increase will depend on the size of the rod; insertion of a small rod into a columnar hole will cause a smaller increase in effective index of the hole than will insertion of a large rod into the columnar hole. Such a device may have two states, an unactuated state wherein the rods are removed from the holes, and a fully actuated states, wherein the rods are fully inserted into the holes. In the exemplary embodiments described hereinbelow, the columnar holes and columnar rods are cylindrical in shape. Devices wherein the holes and rods have different cross-sectional shapes (e.g. elliptical, hexagonal) are contemplated within the spirit and scope of this invention.

Accordingly, a fabrication process is disclosed for making such a two-state photonic crystal structure. As discussed above, the photonic crystal structure is made of an array of air holes or cylinders 250 in a high index background matrix 255. An actuator device is utilized for moving the high index rods 240 into and out of the air cylinders 250. The rods 240 are defined on the same lithographic level as the array of air cylinders 250, and are thus perfectly aligned. The subsequent lithography needs to be aligned to the initial photonic crystal structure 260 and rod structure 240, however a small misalignment doesn't have a significant consequence on the performance of the switching device. However, due to the small size of the switch structure, alignment down to +/−0.05 micrometers may be required.

A variation on the fabrication process is also disclosed. The modified fabrication process relaxes the lithography alignment requirement, and uses electroerosion to remove partially the first etching mask. The remaining pattern actually defines the second level, thus removing the only lithography step that needs to be aligned to better than +/−0.1 micrometers. The remaining lithography steps in the process are then largely within the current state of the art e-beam lithography tools.

Figure 25A:
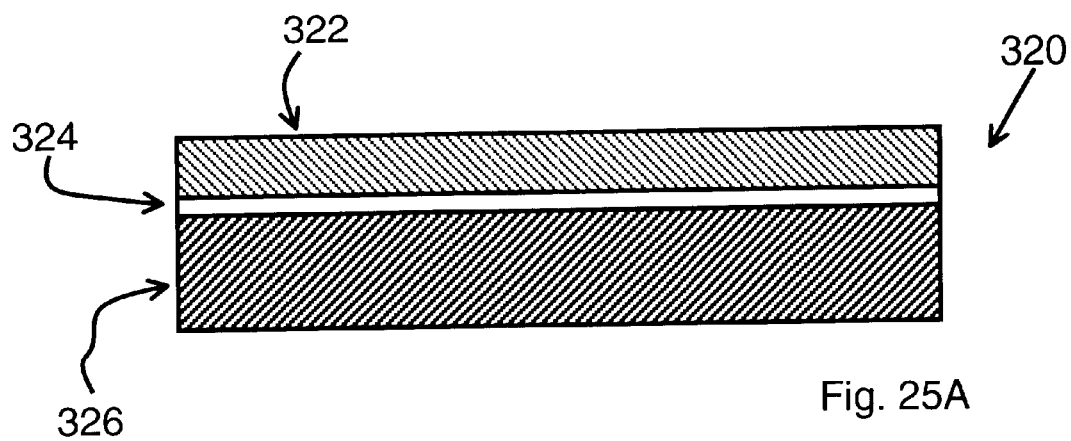
FIGS. 25A, 25B, 25C, 25D, 25E, 25F, 25G, 25H, 25I, 25J, 25K, 25L, 25M, 25N, 25O and 25P are views of a method for constructing the actuated rod device of the present invention.
Figure 25B:
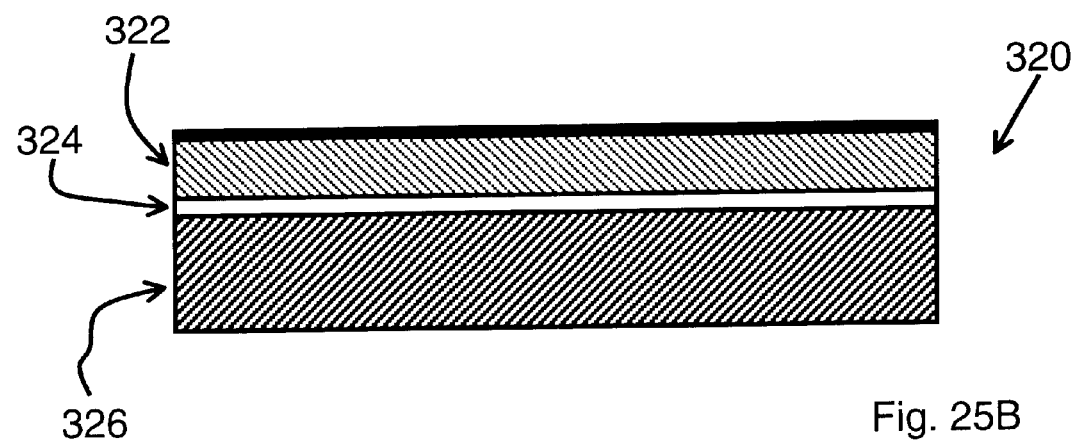
Figure 25C:
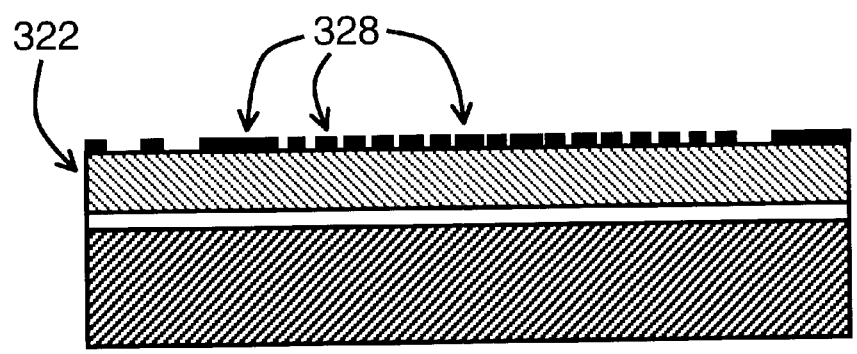
Figure 25D:
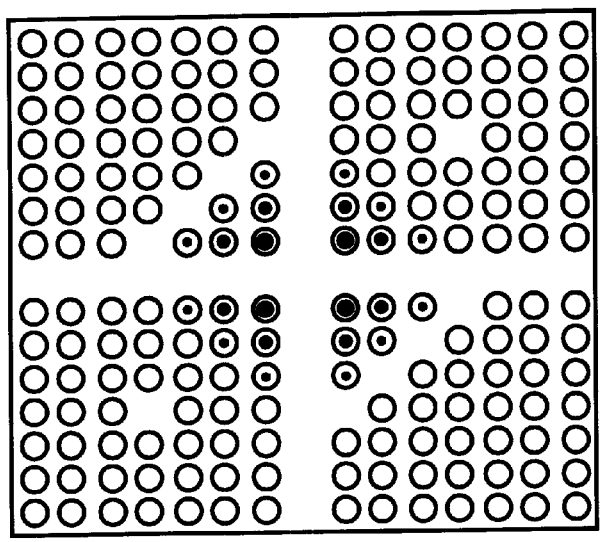
Figure 25E:
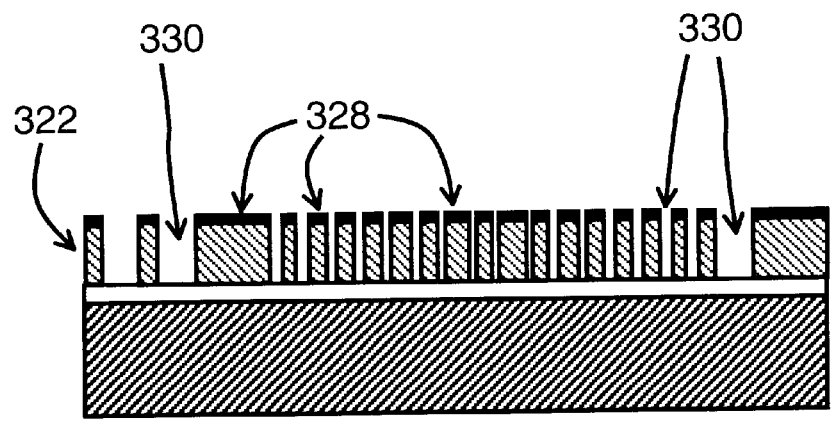
Figure 25F:
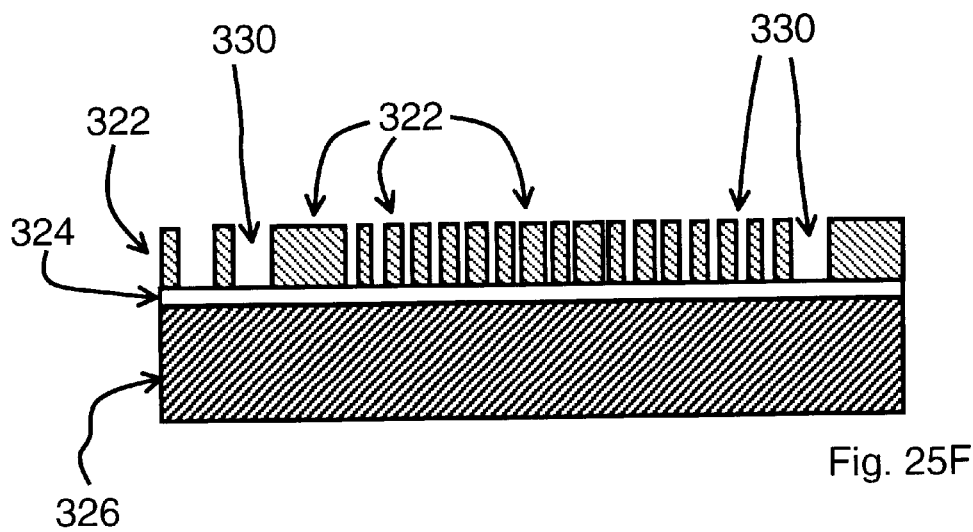
Figure 25G:
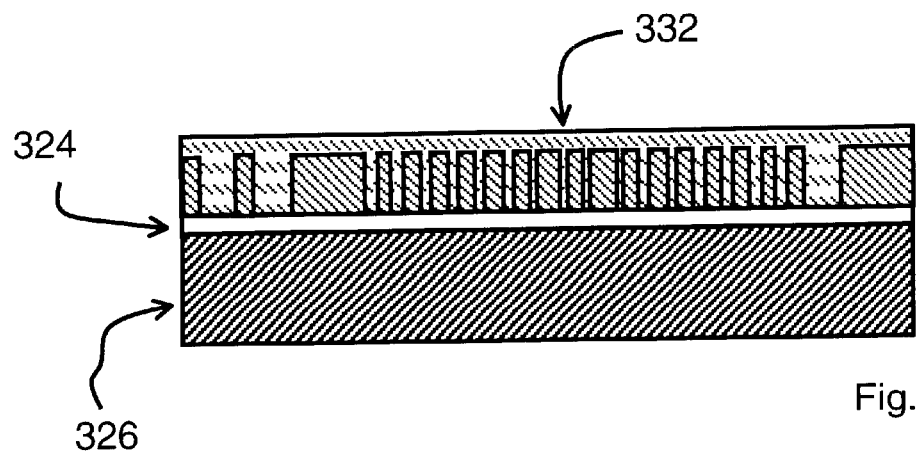
Figure 25H:
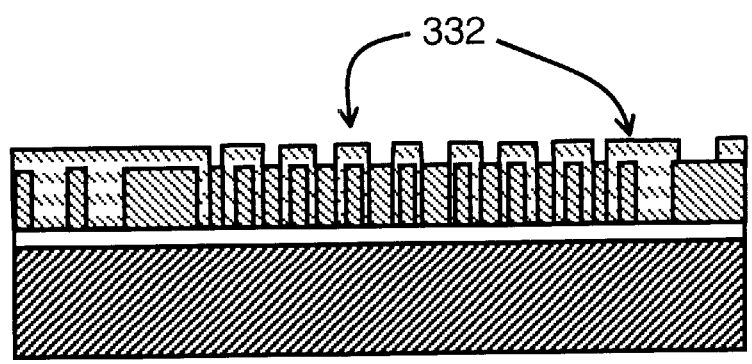
Figure 25I:
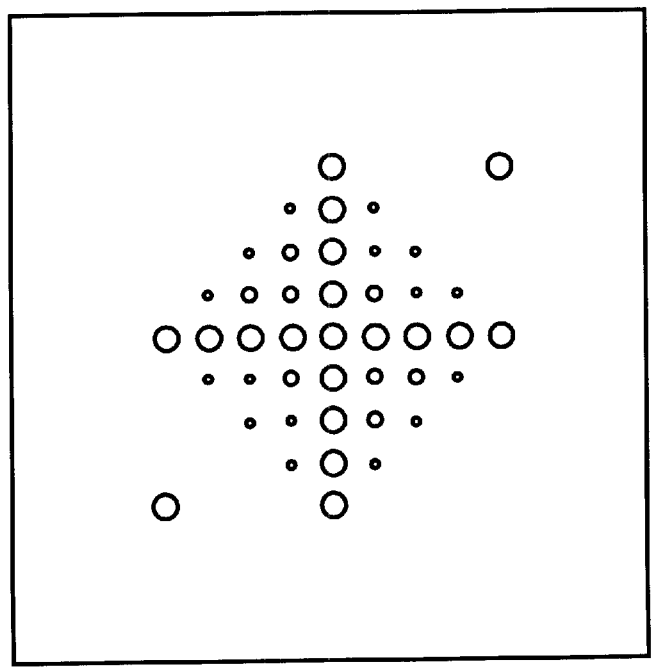
Figure 25J:
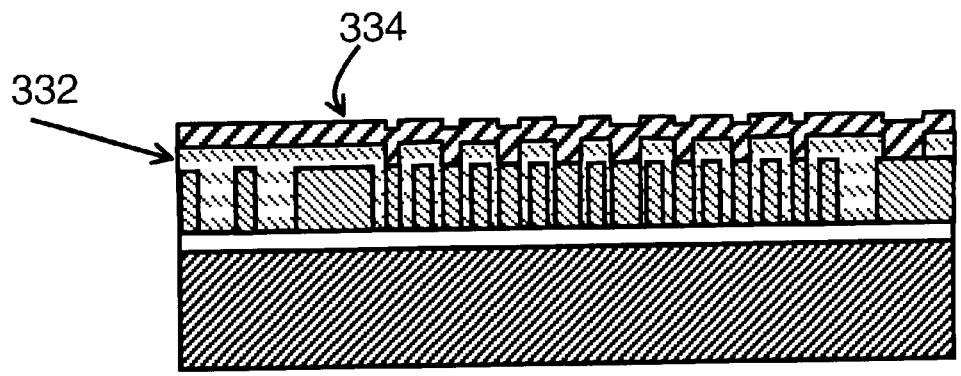
Figure 25K:
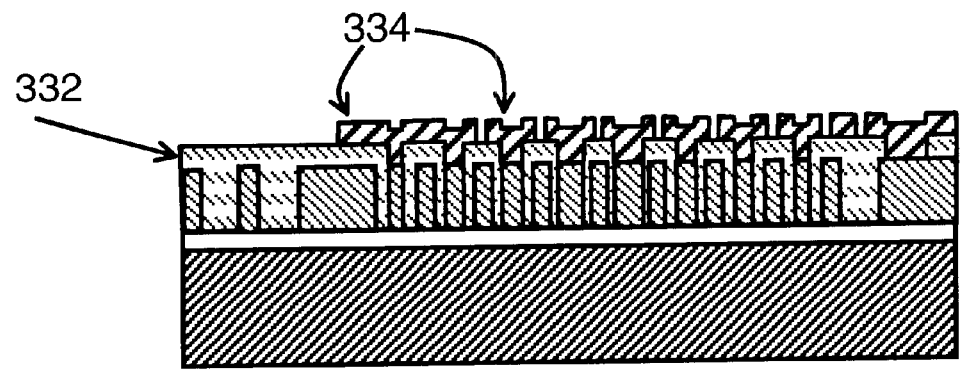
Figure 25L:
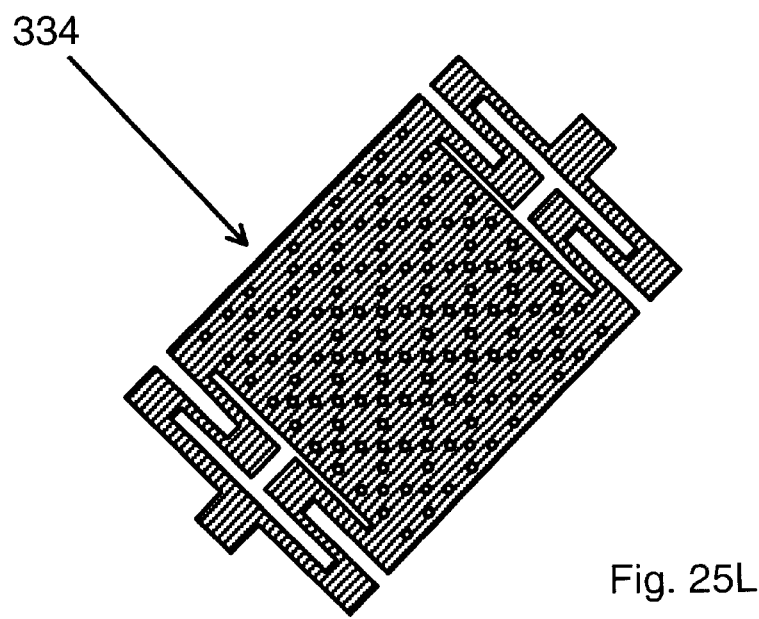
Figure 25M:
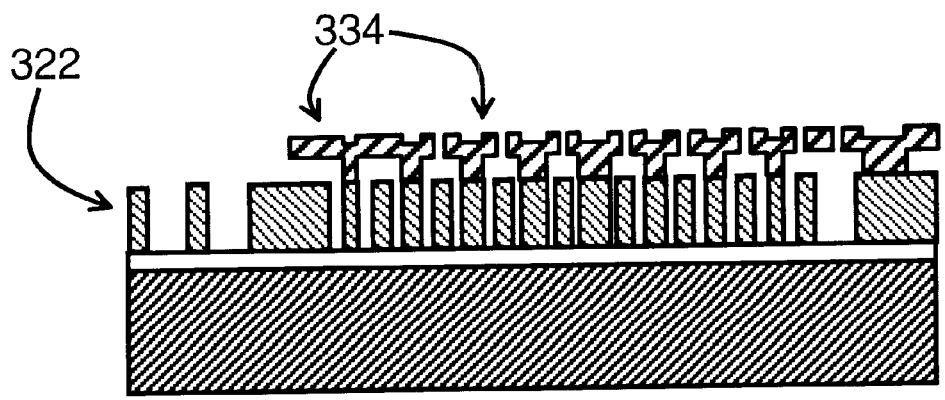
Figure 25N:
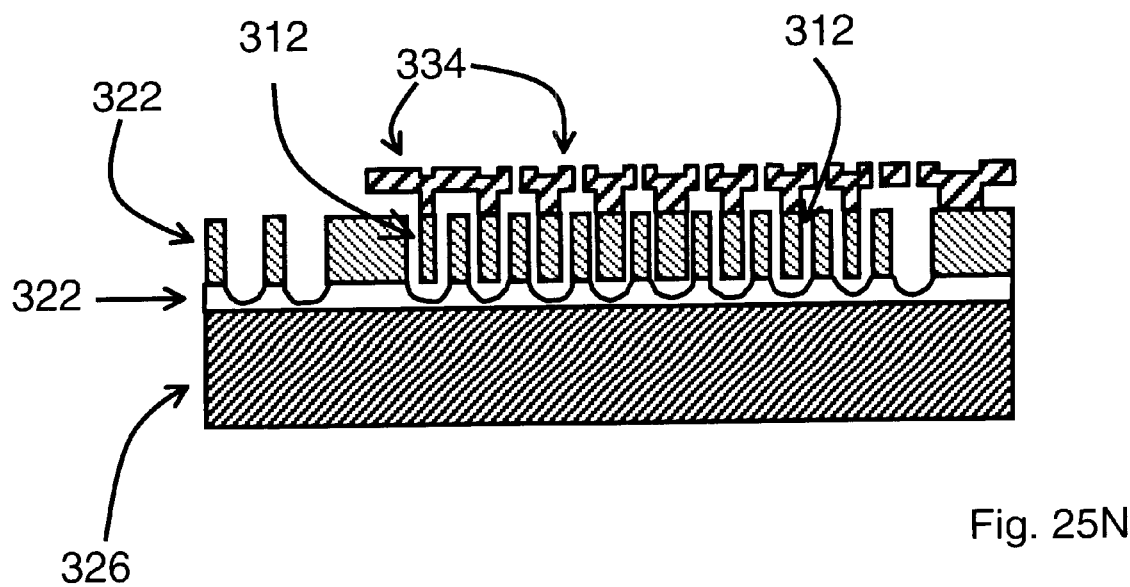
Figure 25O:
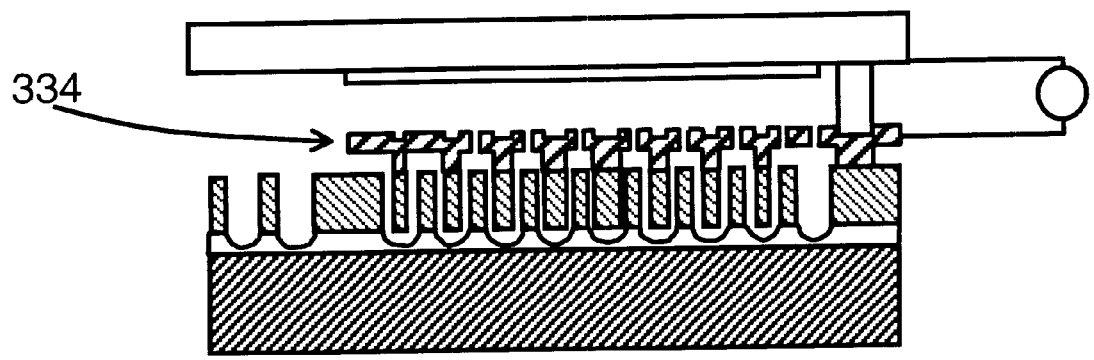
Figure 25P:
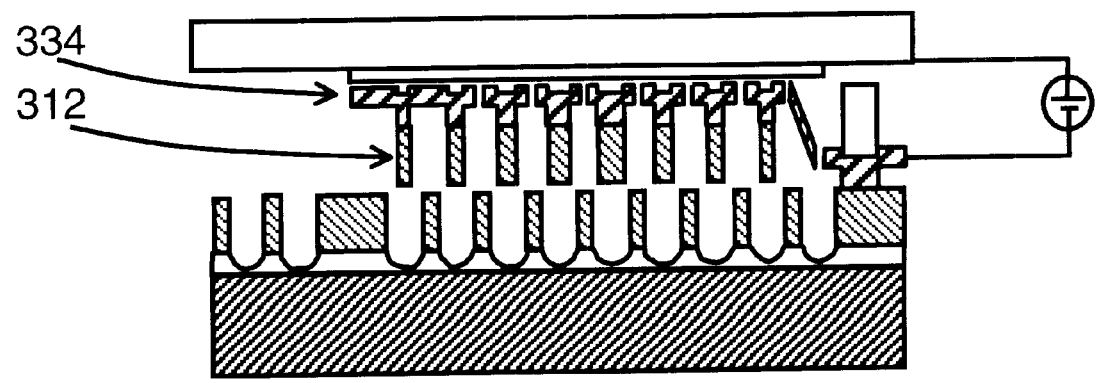

Turning now to FIGS. 25A–25P, the fabrication process according to one embodiment of the invention is disclosed. FIG. 25A shows the silicon on insulator (SOI) substrate structure 320 which includes a layer of silicon 322 deposited on to a layer of silica 324. The silicon 322 and silica 324 are supported by a substrate 326. FIG. 25B shows that a mask layer 328 is deposited onto the silicon layer 322. As shown in FIG. 25C, the material forming the mask layer 328 is patterned. An exemplary lithography mask sketch is shown in FIG. 25D. The areas of the silicon layer 322 which are not protected by the mask layer 328 are etched using a plasma etching process including but not limited to RIE, ICP, ion milling, etc., which produces the various cylinder shaped holes 330 as shown in FIG. 25E. In FIG. 25F, the mask material 328 is removed. It should be noted that this step is optional, since the mask material 328 may be kept in place during manufacturing.

In FIG. 25G, a sacrificial layer 332 is deposited onto the etched silicon layer 322 which extends into each of the various cylinder shaped holes 330. The material forming the sacrificial layer 332 is preferably either self-planarizing or a polishing process is used after coating (CMP, etc.) for producing a flat surface suitable for lithography.

In FIG. 25H the sacrificial layer 332 is patterned. FIG. 25I shows a sketch of the lithography mask. In FIG. 25J a beam material 334 is coated onto the sacrificial layer 332. Depending upon the actuation scheme chosen, the beam material 334 may be conductive, bilayer of two different coefficient of thermal expansion (CTE) material, shape memory alloy, etc. FIG. 25K discloses the step of patterning the beam material 334. A sketch of the lithography mask 336 is shown in FIG. 25L. In FIG. 25M the sacrificial layer 332 is removed by selective etching processes which may include wet etching or isotropic dry etching. FIG. 25N shows the step for etching the silica layer 324 under the silicon layer 322 for releasing the actuable rod 312.

Depending upon the actuation scheme chosen, different finishing steps may be required. If the actuation is electrostatic, the beam 334 must include a conductive layer. A counter-electrode must be positioned above the photonic crystal switch region with an insulating spacer (not specifically shown).

Figure 26:
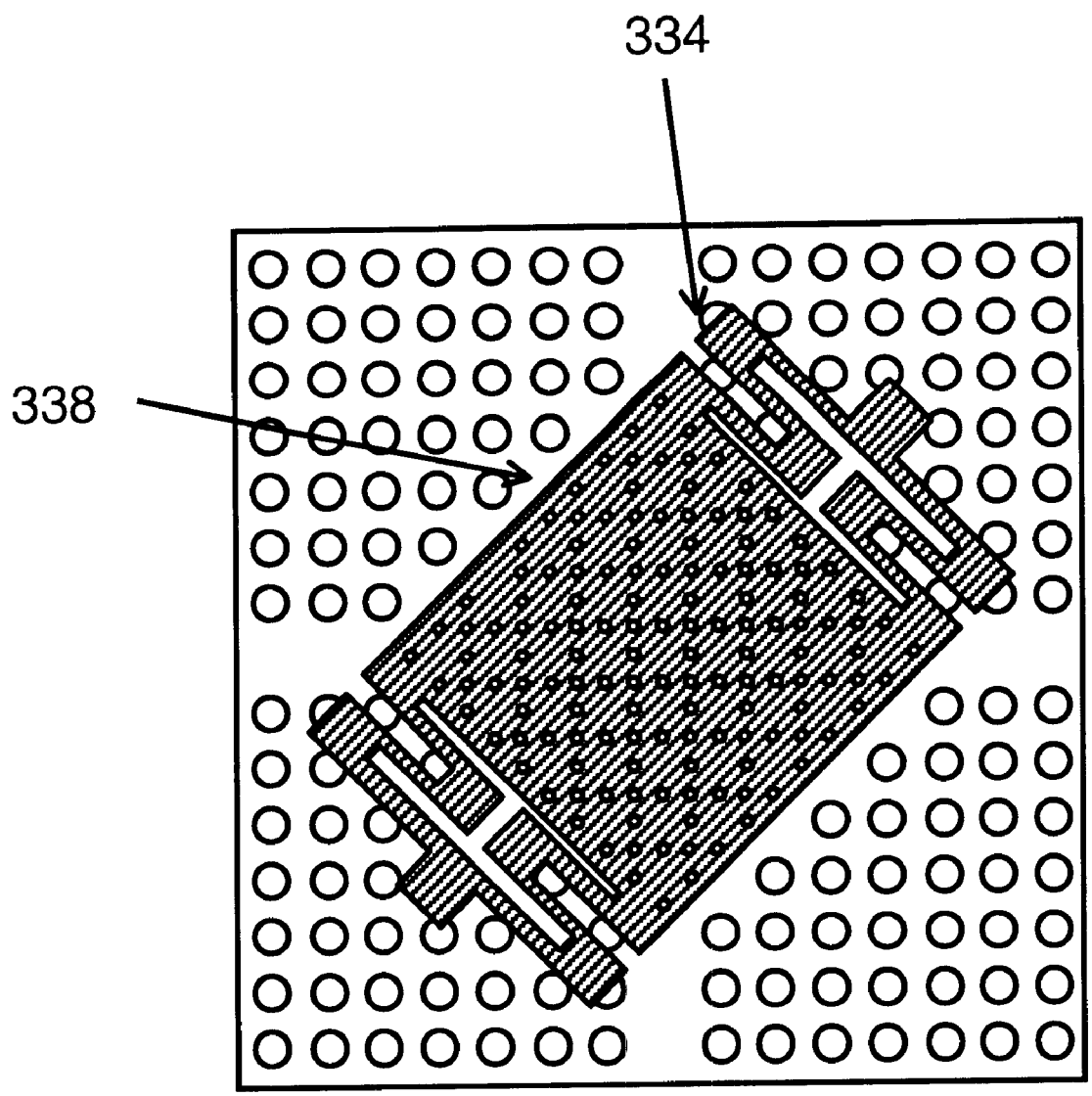
FIG. 26 is a view of a beam structure for use in the present invention.

As will be appreciated, other actuation techniques are compatible with the process of the present invention. The beam 334 can be made of a bilayer of materials with different CTE. When an electric current passes through the thin part of the beams 334, Ohmic heating occurs and the bilayer beams 334 bend upwardly. With a beam structure inspired from the sketch of FIG. 26, the large central portion 338 attached to the rods 312 is up when the thin part is heated. Additionally, other actuation techniques include, but are not limited to, shape memory alloy, piezoelectric material and magnetic material.

Figure 27A:
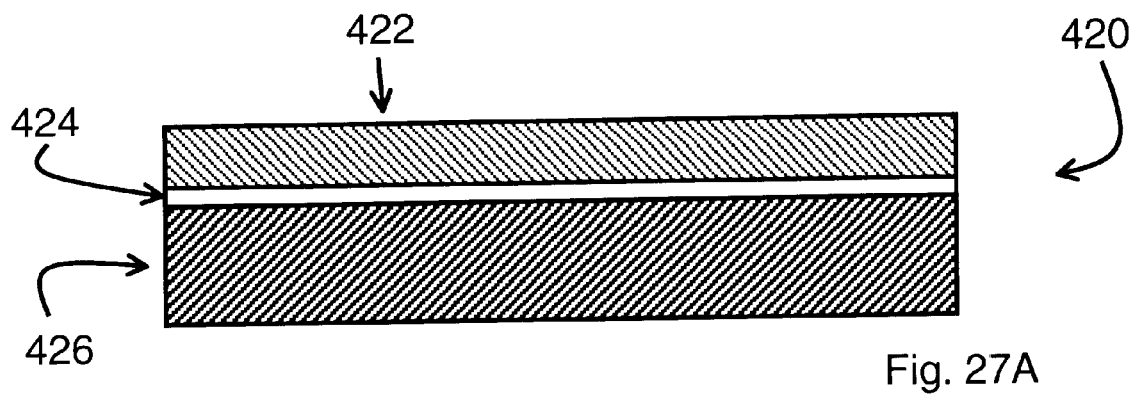
FIGS. 27A, 27B, 27C, 27D, 27E, 27F, 27G, 27H, 27I, 27J, 27K, 27L, 27M and 27N are views of an alternate method for constructing the actuated rod device of the present invention.
Figure 27B:
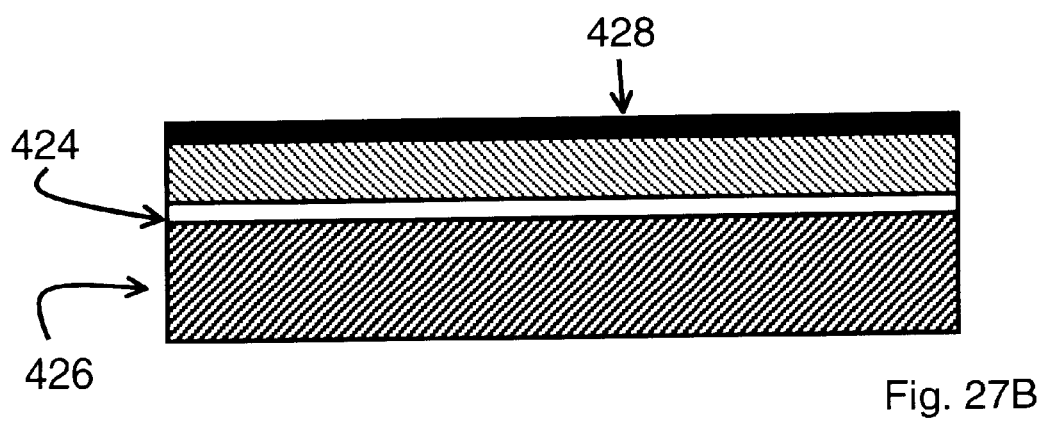
Figure 27C:
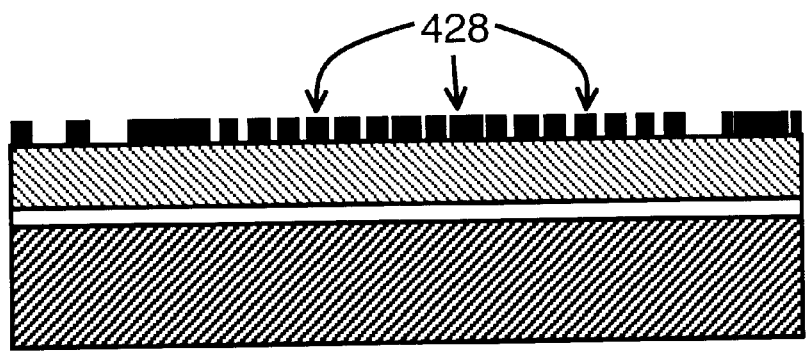
Figure 27D:
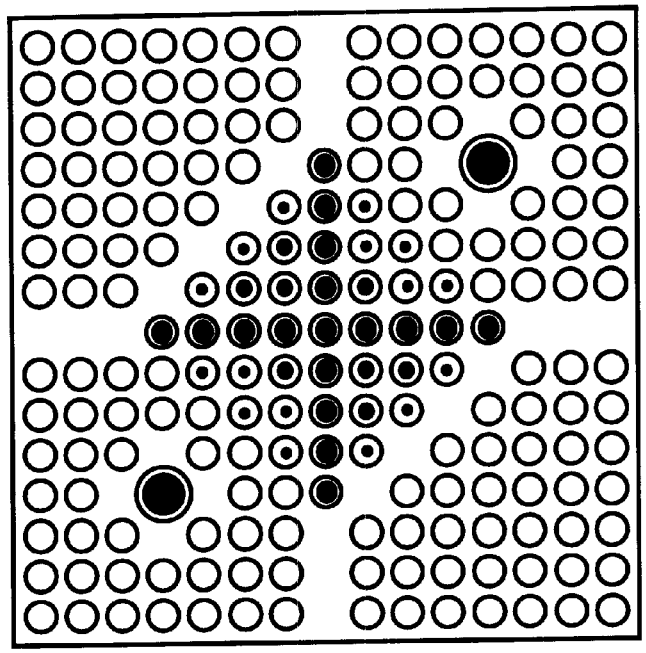
Figure 27E:
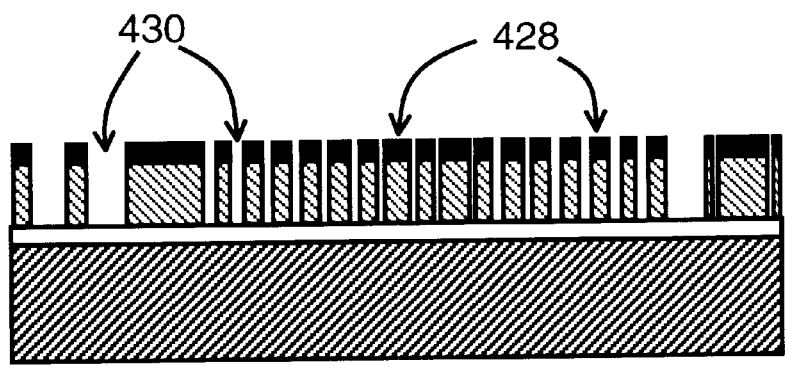
Figure 27F:
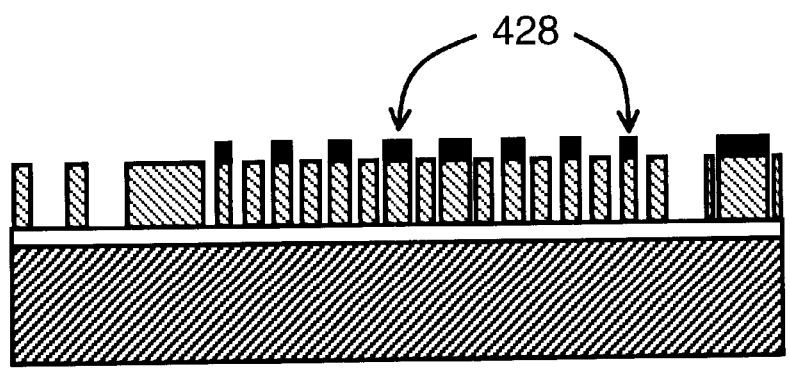
Figure 27G:
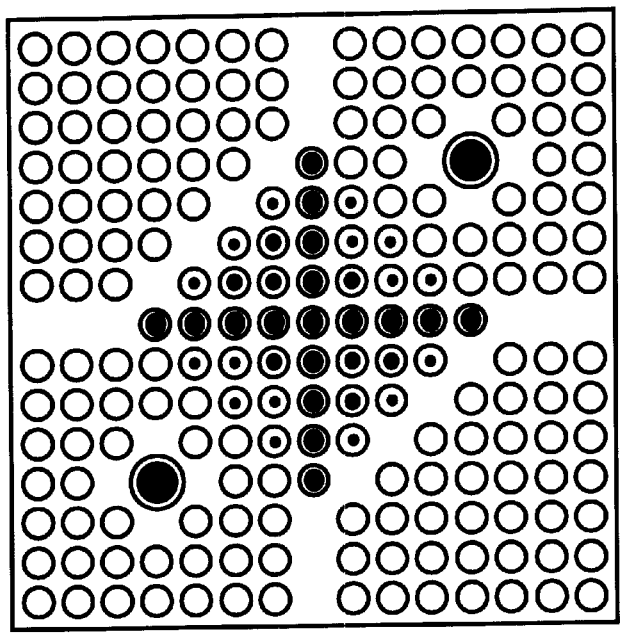
Figure 27H:
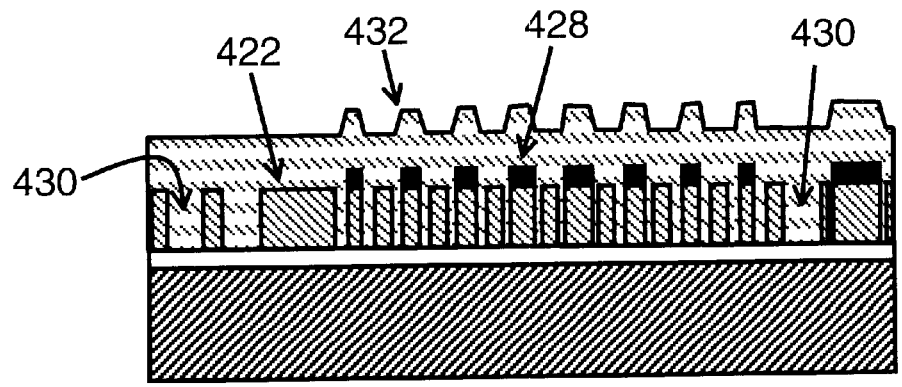
Figure 27I:
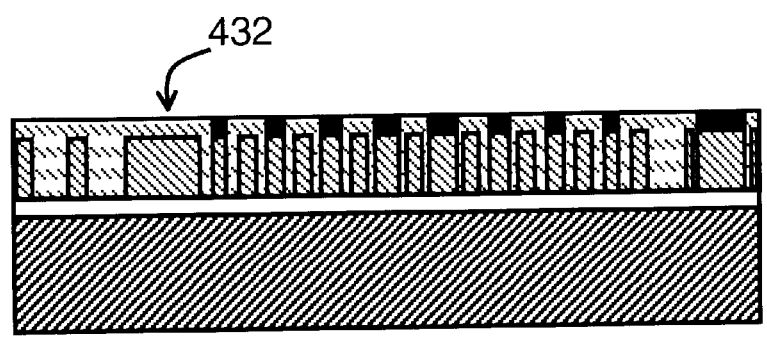
Figure 27J:
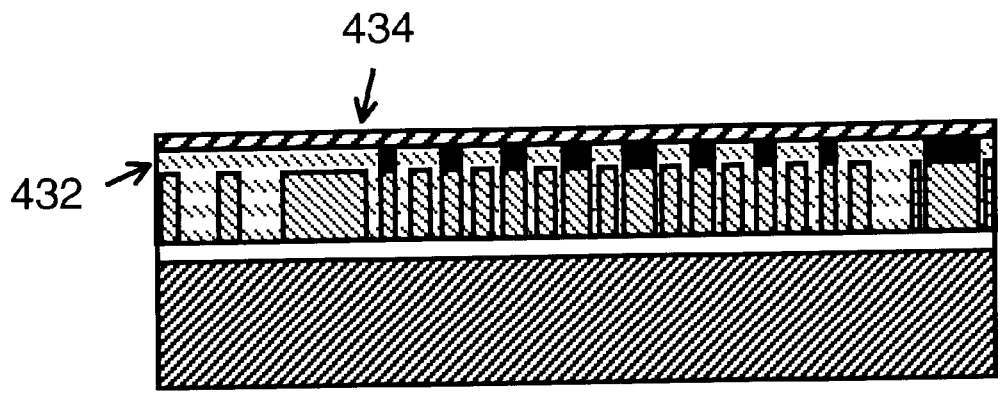
Figure 27K:
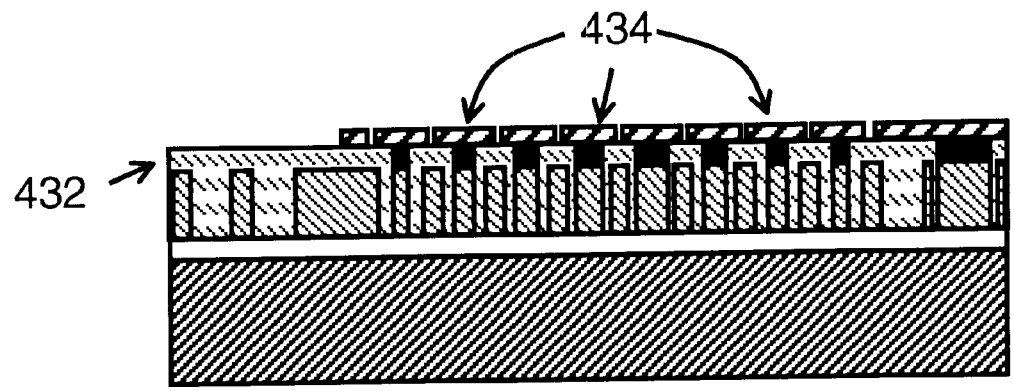
Figure 27L:
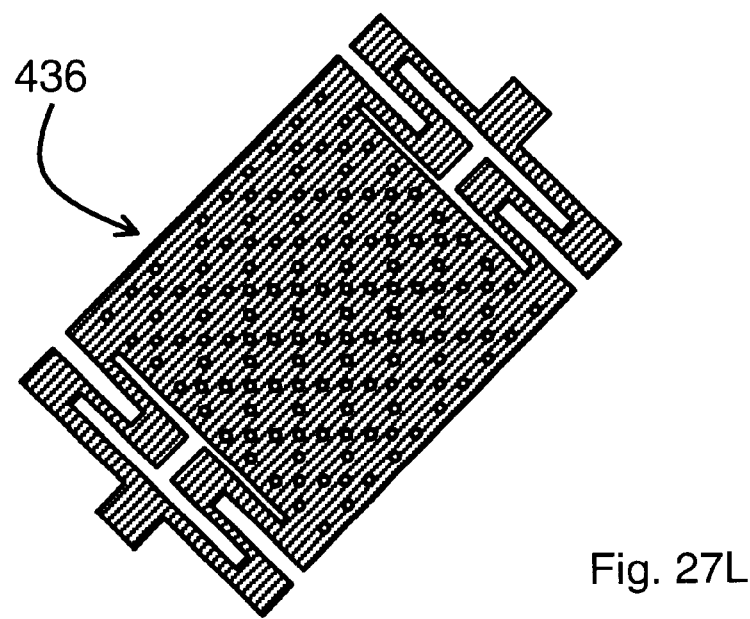
Figure 27M:
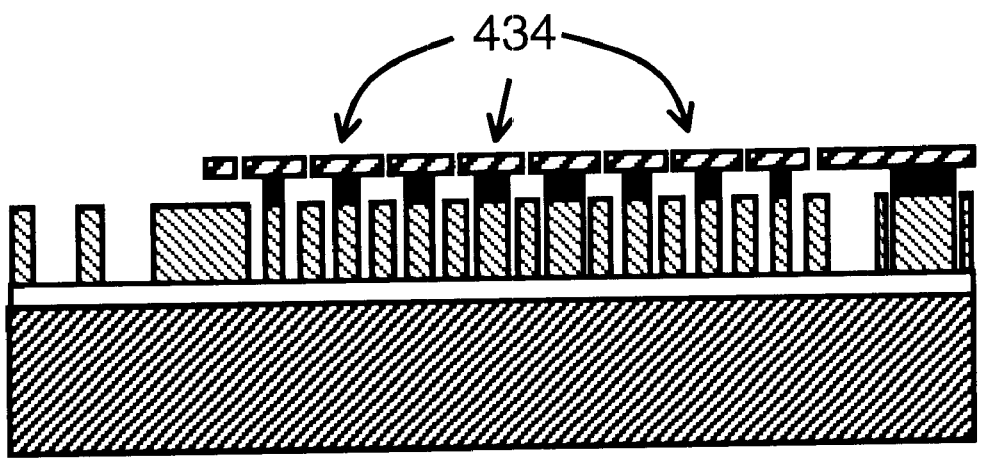
Figure 27N:
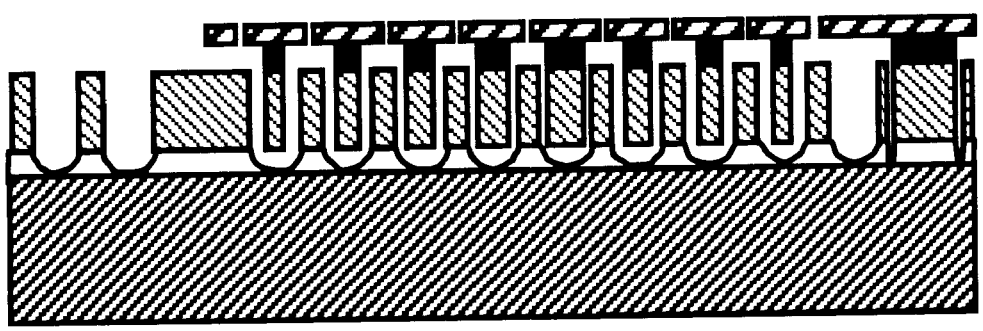

Referring now to FIGS. 27A–27N, the fabrication process according to another embodiment of the invention is disclosed. FIG. 27A shows the silicon on insulator (SOI) substrate structure 420 which includes a layer of silicon 422 deposited onto a layer of silica 424. The silicon 422 and silica 424 are supported by an insulating layer 426. FIG. 27B shows that a mask layer 428 is deposited onto the silicon layer 422. As part of this embodiment, the mask layer 428 must be conductive and electro-erodable. As shown in FIG. 27C, the material forming the mask layer 428 is patterned. The lithography mask sketch is shown in FIG. 27D. The areas of the silicon layer 422 which are not protected by the mask layer 428 are etched using a plasma etching process including but not limited to RIE, ICP, and ion milling, which produces the various cylinder shaped holes 430 as shown in FIG. 27E. In FIG. 27F, the mask material 428 is electro-eroded. It should be noted that as part of this step only connected regions are etched. In the top view of FIG. 27G, only the filled areas representing the mask material 428 remain.

In FIG. 27H, a sacrificial layer 432 is deposited over the etched silicon layer 422, over the remaining mask material 428 portions, and extends into each of the various cylinder shaped holes 430. As shown in FIG. 27I the material forming the sacrificial layer 432 is planarized down to the level of the mask material using a polishing process such as CMP.

In FIG. 27J a beam material 434 is coated onto the sacrificial layer 432. Depending upon the actuation scheme chosen, the beam material 434 may be conductive, bilayer of two different coefficient of thermal expansion (CTE) material, and shape memory alloy. FIG. 27 discloses the step of patterning the beam material 434. A sketch of the lithography mask 436 is shown in FIG. 27L. In FIG. 27M the sacrificial layer 432 is removed by selective etching processes which may include wet etching or isotropic dry etching. FIG. 27N shows the step for etching the silica layer 424 under the silicon layer 426 for releasing the actuable rod 240 and any other movable parts. The anchors 438 remain attached to the substrate 420 because of their larger size. As will be appreciated by one skilled in the art a variety of techniques may be employed for actuating the rods 240 with respect to the air cylinders 250.

As the person of skill in the art will recognize, the planar photonic crystal waveguide devices of the present invention may include additional sets of columnar rods, with each set of being coupled to a separate actuator and being separately actuable to modify the propagation of the optical signal in the planar photonic crystal structure.

Figure 28:
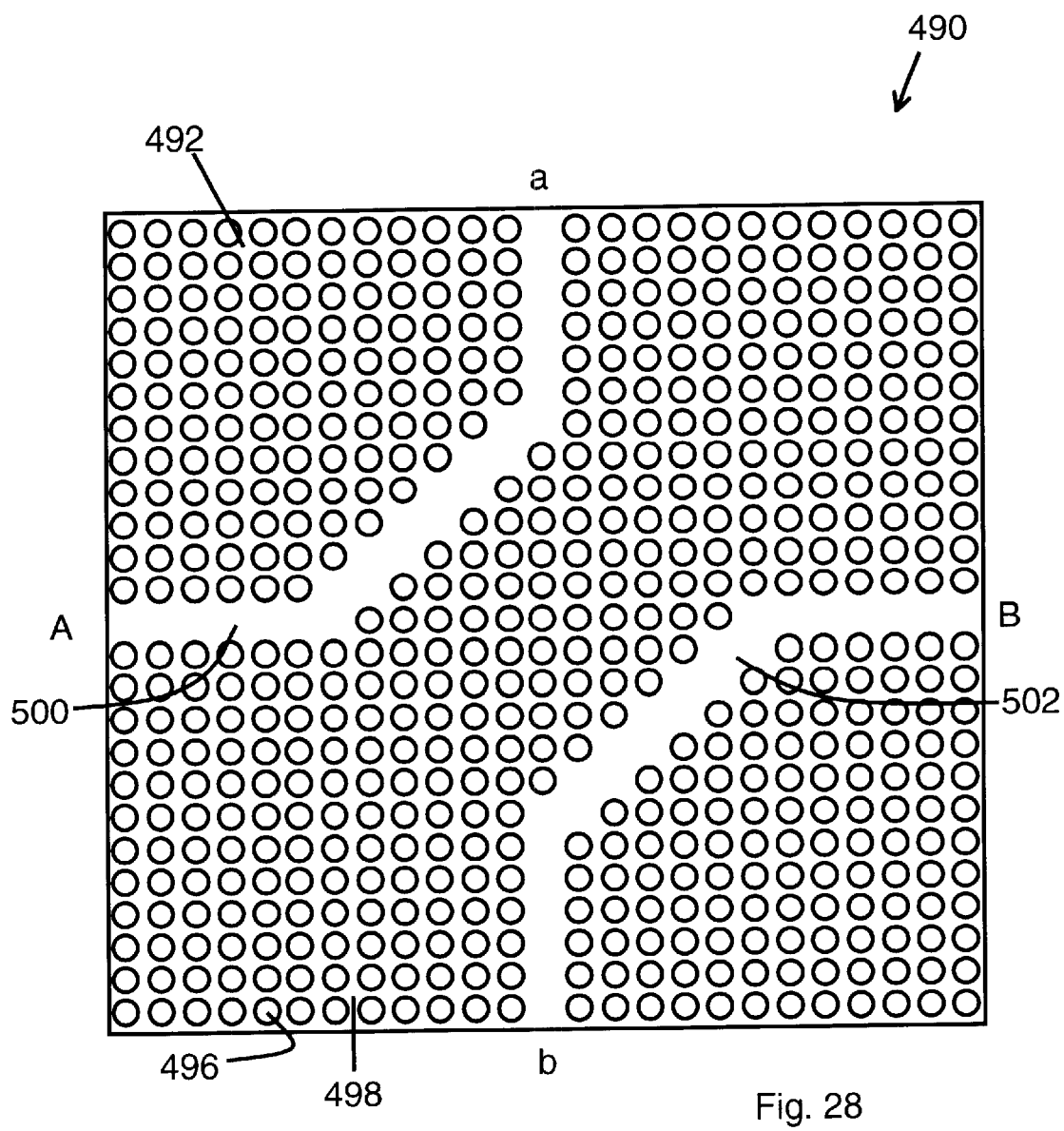
FIG. 28 is a view of an exemplary 2×2 switching device of the present invention.

The inventive concept of altering the optical properties of a planar photonic crystal structure by inserting rods into the holes of the planar photonic crystal structure may be exploited in a variety of devices. An exemplary 2×2 switching device is shown in FIG. 28. Switch 490 is produced by forming a photonic crystal structure 492 on a suitable substrate (not shown), preferably using semiconductor manufacturing techniques. The photonic crystal structure 492 comprises a lattice of low index cylinders or columns 496 disposed within a high index background matrix 498. The columns 496 can be filled with air. The columns 496 and the background matrix 498 form a layer of material disposed on top of the substrate 494.

A first bidirectional waveguide 500 shown as a-A and a second bidirectional waveguide 502 shown as b-B are formed within the photonic crystal structure 492. The cylinders 496 surrounding each waveguide 500, 502 create a complete photonic band gap which produces high bending efficiency and prevents light from escaping outside the waveguides 500, 502. The high bending efficiency allows for a higher level of integration for producing more complex optical processing devices. For example, a 1000×1000 cross-connect device can be manufactured on a substrate of 1×1 cm dimensions or smaller. It is also envisioned that a wavelength division multiplexer (WDM) can be manufactured using photonic crystal switch 490. Thus, the bidirectional 2×2 switch 490 can be used as the building block for a larger sized switch matrix.

In the configuration shown in FIG. 28, light traveling along waveguides 500, 502 cannot go straight, but rather can only turn from A to a and b to B. It should be noted that the light guiding effect is bidirectional. As such, light can propagate from A to a or from a to A, and from B to b or b to B.

Figure 29:
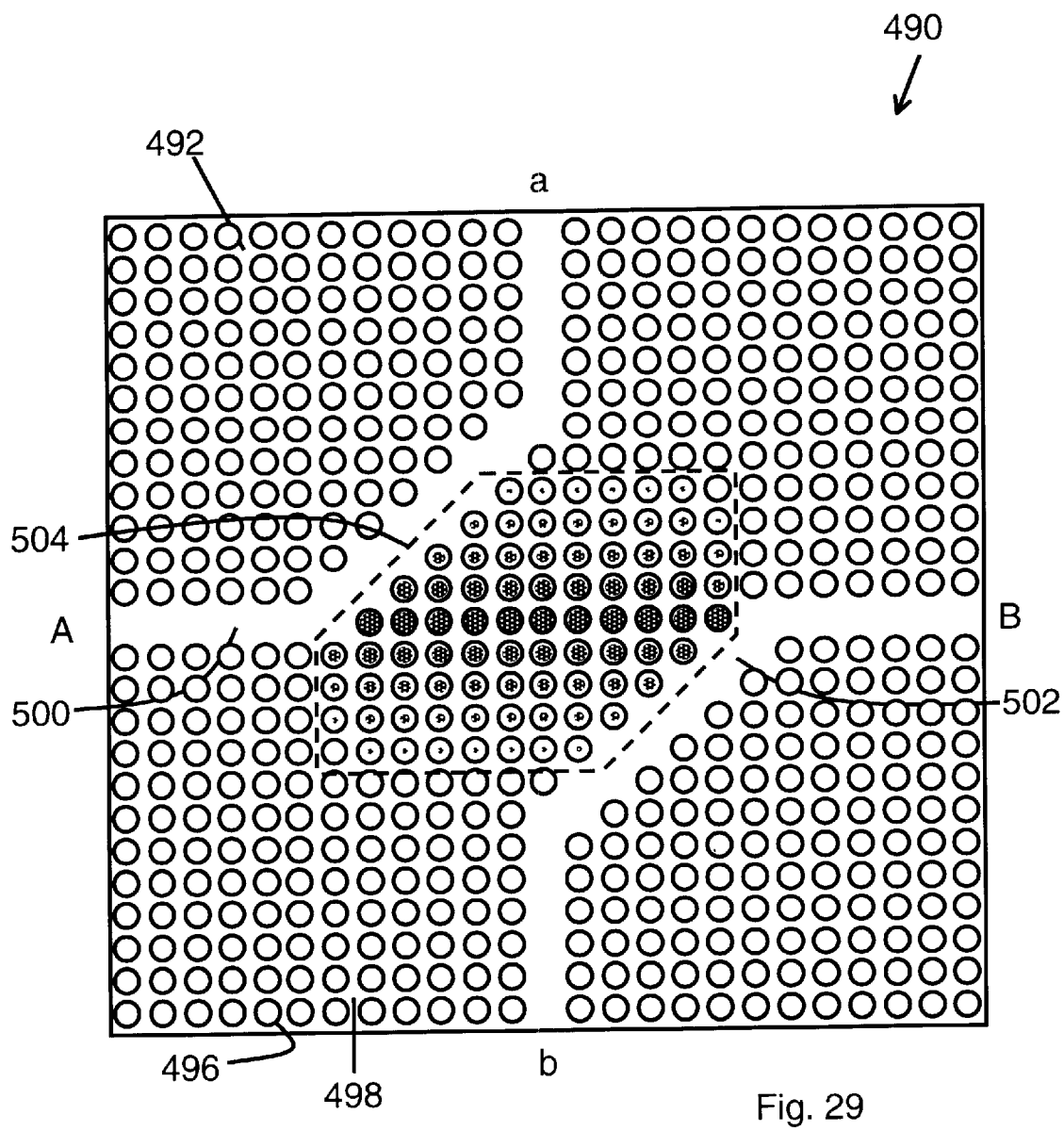
FIG. 29 is a view of a switching feature in a device of the present invention.

Turning now to FIG. 29, a switching feature associated with switch 490 is shown. More specifically, if a low index portion, i.e. cylinders 496, in the central region 504 of the photonic crystal structure 492 is modified so as to create a waveguide through the central region 504. The device 490 can be switched into an alternate mode where light can propagate from A to B. In order to prevent light from being split in two paths, one portion going straight along waveguide A-B and one portion turning along waveguide A-a, the refractive index of the holes or cylinders 496 surrounding the turning waveguide 506 is slightly changed in such a manner that the turning waveguide 506 is no longer efficiently guiding light.

Figure 30:
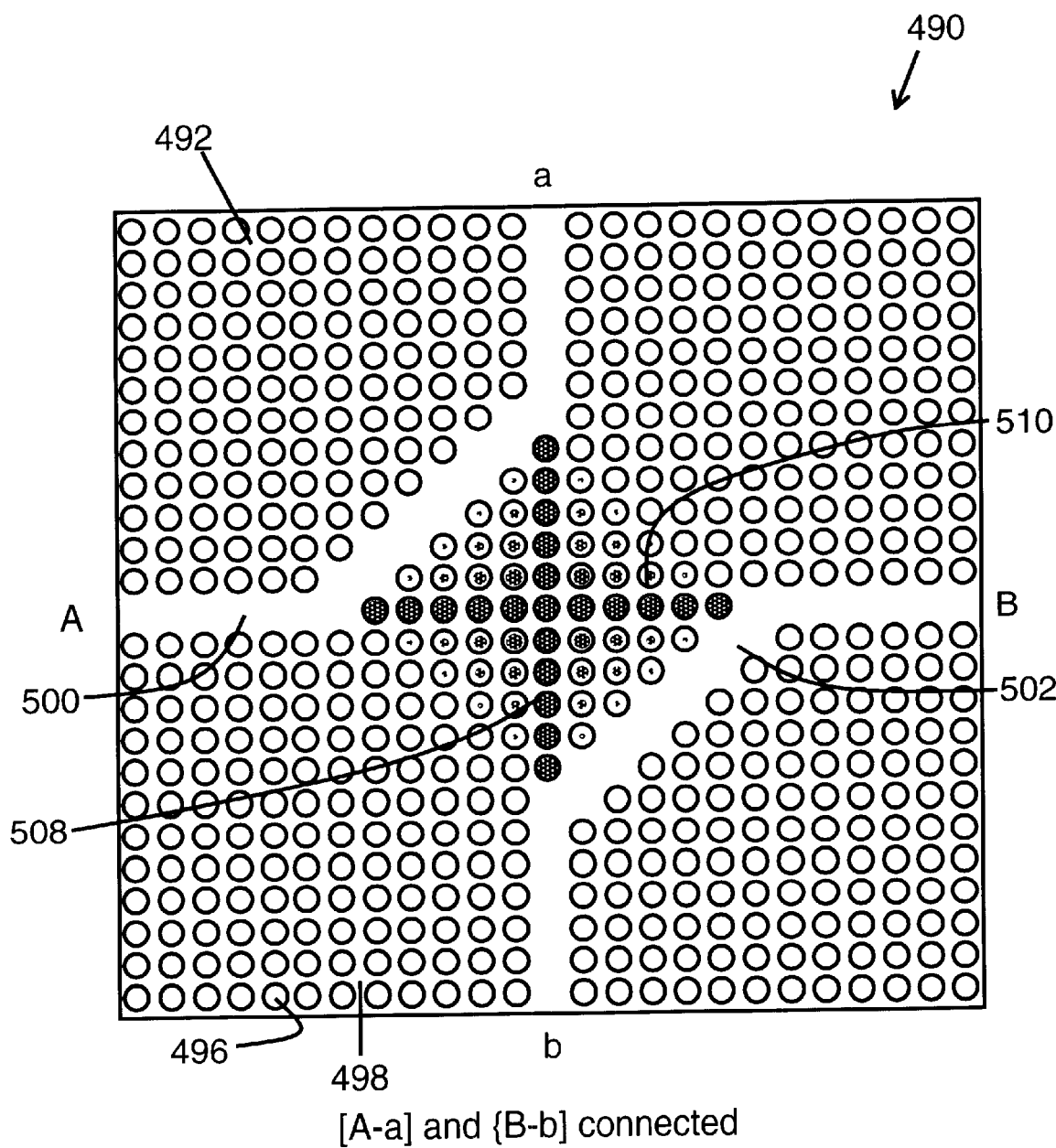
FIGS. 30 and 31 are views of the off state and the on state, respectively, of the exemplary 2×2 switch.
Figure 31:
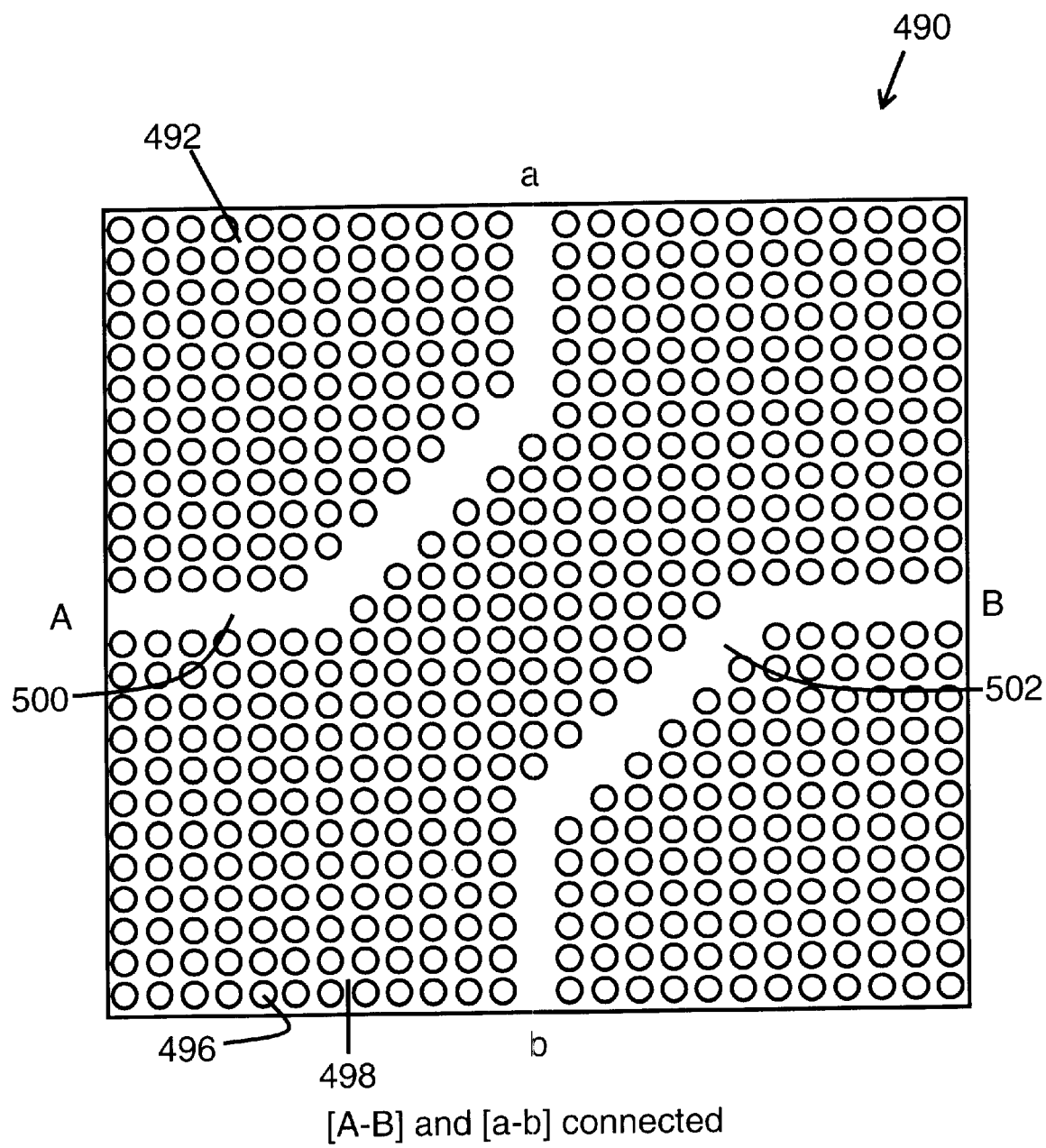

FIGS. 30 and 31 show the off-state and on-state respectively for the switch 490. The off-state of FIG. 30 assumes that the refractive index of the cylinders 496 within the central region 504 is unchanged and maintained at a low refractive index, similar to that of the cylinders outside of the central region 504. The on-state of FIG. 31 assumes that the refractive index of the cylinders 496 within the central region 504 is modified along one of two switchable waveguide pathways to a high refractive index; specifically waveguide pathway 108 connecting waveguides A-B and/or waveguide pathway 510 connecting waveguides b-a. As will be appreciated, by changing the refractive index of the cylinders 496 along waveguide pathway 508 from the off-state to the on-state (low index to high index), waveguide port A may be effectively switched from port a to port B. In a similar fashion, by changing the refractive index of the cylinders 496 along waveguide pathway 510 from the off-state to the on-state (low index to high index), waveguide port b may be effectively switched from port B to port a.

One technique for altering the refractive index of the cylinders 496 from low index to high index and back is to selectively fill predetermined air cylinders 496 with a high index solid material. More specifically, a solid plate having complimentary shaped male cylinders can be activated into the air cylinders 496 for creating a waveguide of solid and uniform index material. Additionally, other designs are envisioned which utilize a triangular or honeycomb lattice of cylinders 496, and may be more effective than a square lattice as they produce a larger photonic band-gap for both TM and TE polarizations.

As described above, the objective for performing the switching function is to realize a photonic crystal device with means for changing the refractive index of the cylinders 496, normally filled with air, by inserting small rods 512 of high index material into the photonic crystal holes forming the cylinders 496. The diameter of the inserted rod 512 sets the magnitude of the modification. More specifically, smaller diameter rods produce smaller modification to the refractive index, whereas larger diameter rods produce larger modification to the refractive index and thus the photonic bandgap structure. FIG. 30 shows the cylinders 496 within the central region 504 being filled with air. FIG. 31 shows the cylinders 496 having high index rods 512 inserted within the central region 504 for creating straight waveguides 508, 510.

Thus, the optical device described above in connection with FIGS. 28–31 has, referring to FIG. 28, a first waveguide segment 500, which has an input segment, and output segment, and a bend segment coupling the input segment to the output segment. The device likewise has a second waveguide segment 502, which has an input segment, and output segment, and a bend segment coupling the input segment to the output segment. The input segment of the first waveguide segment is collinear with the output segment of the second waveguide segment; similarly, the input segment of the second waveguide segment is collinear with the output segment of the first waveguide segment. The planar photonic crystal structure includes a switching region contiguous with the bend segments of the first and second waveguide segments. The device includes a set of columnar rods, shown as filled circles in FIG. 29, registered to holes in the switching region 504 of the planar photonic crystal structure. In an unactuated state, an optical signal entering the input segment of the first waveguide segment negotiates the bend and propagates through the output segment of the first waveguide segment. Similarly, an optical signal entering the input segment of the second waveguide segment negotiates the bend and propagates through the output segment of the second waveguide segment. In a fully actuated state, the set of columnar rods is inserted into the columnar holes in the switching region, such that an optical signal entering the input segment of the first waveguide segment crosses the switching region and propagates through the output segment of the second waveguide segment, and an optical signal entering the input segment of the second waveguide segment crosses the switching region and propagates through the output segment of the first waveguide segment.

Figure 32:
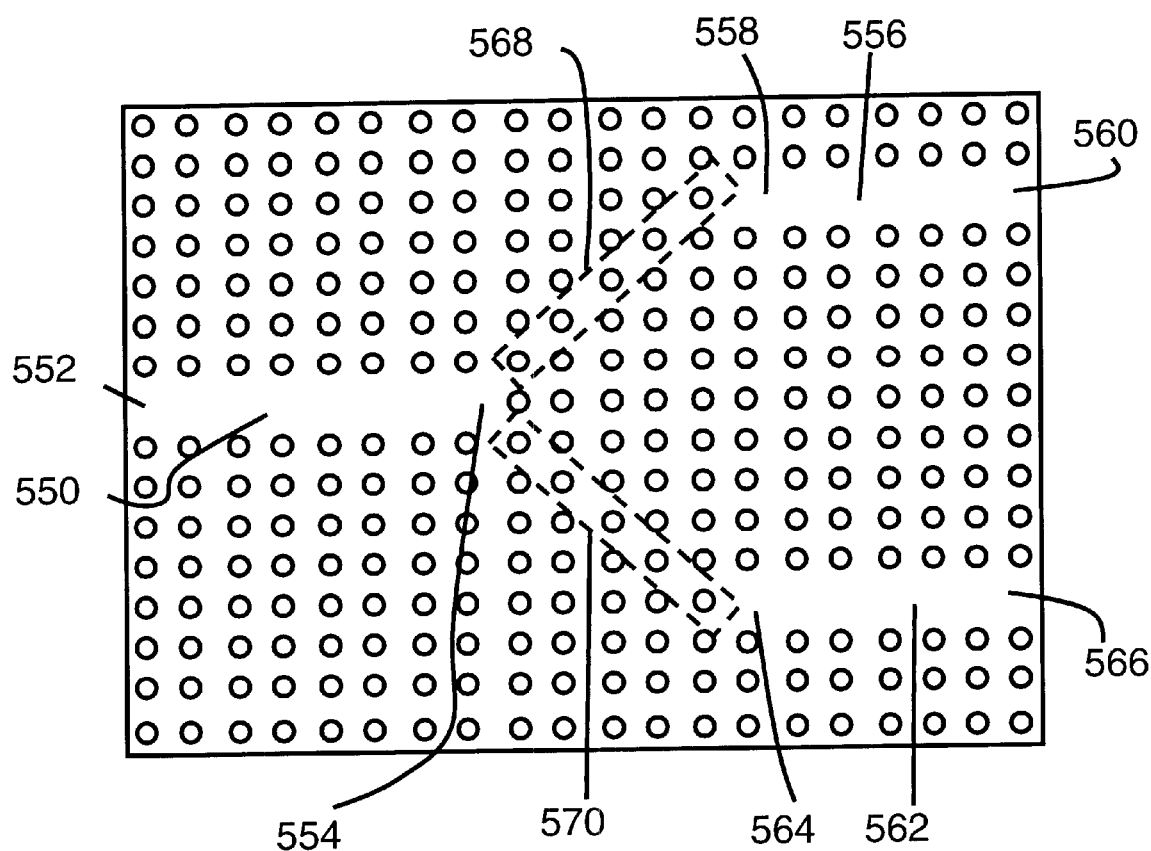
FIGS. 32, 33, and 34 is a top views of an exemplary 1×2 switch constructed in accordance with the present invention in an unactuated state, a first actuated state, and a second actuated state, respectively.
Figure 33:
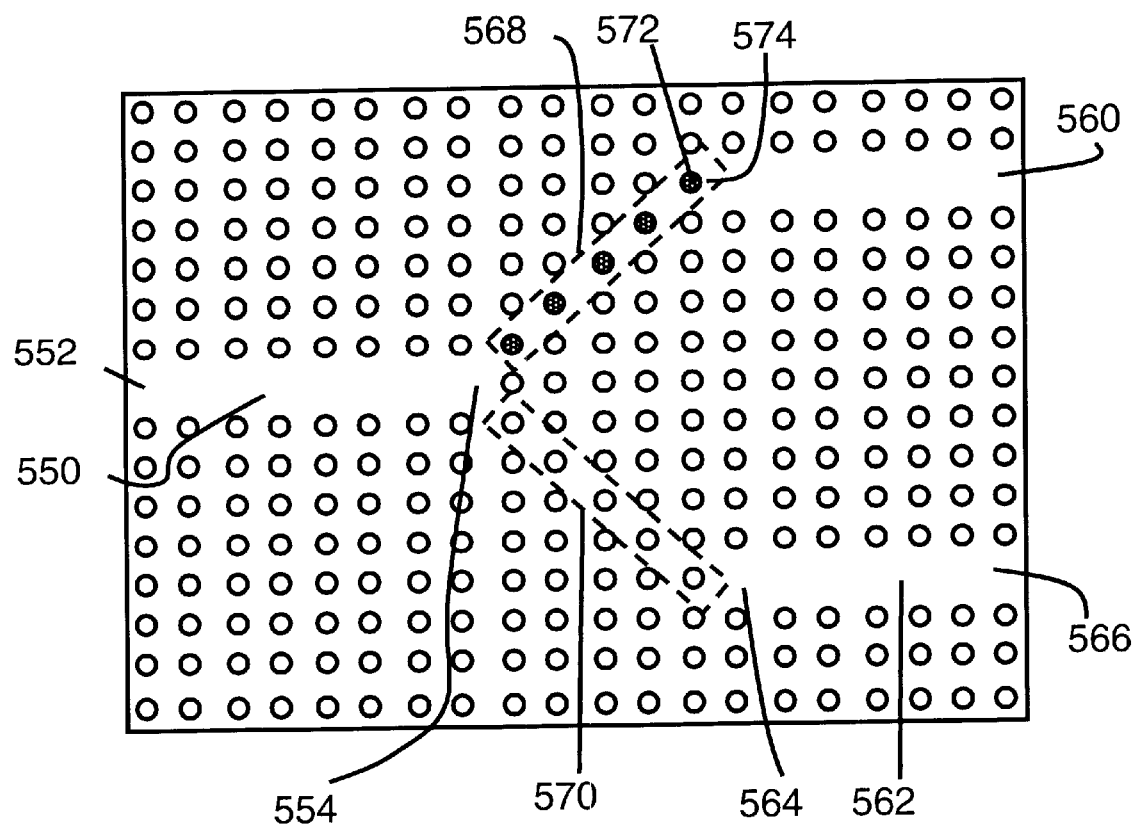
Figure 34:
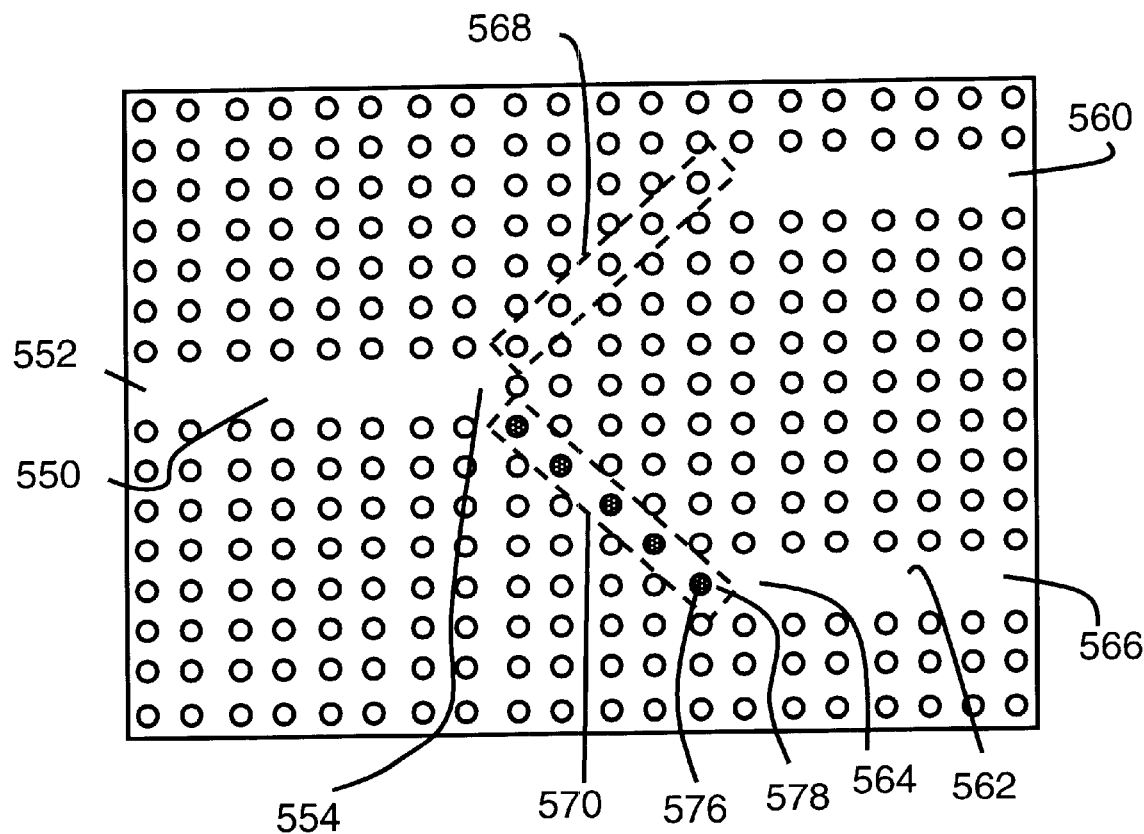

An exemplary 1×2 switch constructed in accordance with the present invention is shown in top view in FIGS. 32–34. The defect waveguide includes an input waveguide segment 550, which has an input end 552 and a coupler end 554; a first output waveguide segment 556, which has a coupler end 558 and an output end 560; and a second output waveguide segment 562, which has a coupler end 564 and an output end 566. The planar photonic crystal structure 558 includes a first coupling region 568, which is contiguous with the coupler end 554 of the first waveguide segment 550, and the coupler end 558 of the first output waveguide segment 556; and a second coupling region 570, which is contiguous with the coupler end 564 of the second output waveguide 562. In the unactuated state, shown in FIG. 32, the parameters of the planar photonic crystal structure are such that an optical signal propagating in the input waveguide segment is prohibited from coupling through the coupling regions 568 and 570 into the output waveguides 556 and 562.

The device is shown in a first actuated state in FIG. 33. In the Figs. of this application, actuated rods are denoted by filled circles. The diameter of the filled circle corresponds to the diameter of the rod, and therefore to the magnitude of the index modification caused by the rod. There is a set of columnar rods 572 registered to the columnar holes 574 of the first coupling region 568. The set of rods is coupled to an actuator (not shown), which is controllable to insert and remove the rods from the holes. In this first actuated state, the rods are inserted into the holes 475, and a new section of defect waveguide is formed in the first coupling region, linking the coupler end 554 of input waveguide segment 550 with the coupler end 558 of first output waveguide segment 556, thereby allowing an optical signal to propagate from the input waveguide segment to the first output waveguide segment.

The device is shown in a second actuated state in FIG. 34. In a fashion similar to that described above, there is a second set of columnar rods 576 registered to the columnar holes 578 of the second coupling region 570. The second set of columnar rods is coupled to a second actuator (not shown), which is controllable to insert and remove the rods from the holes. In this second actuated state, a new section of defect waveguide is formed in the second coupling region, linking the coupler end 554 of input waveguide segment 550 with the coupler end 564 of first output waveguide segment 562, thereby allowing an optical signal to propagate from the input waveguide segment to the second output waveguide segment. As the skilled artisan will recognize, by judicious control of the actuators, this exemplary device may function as a 1×2 switch or a power splitter.

Figure 35:
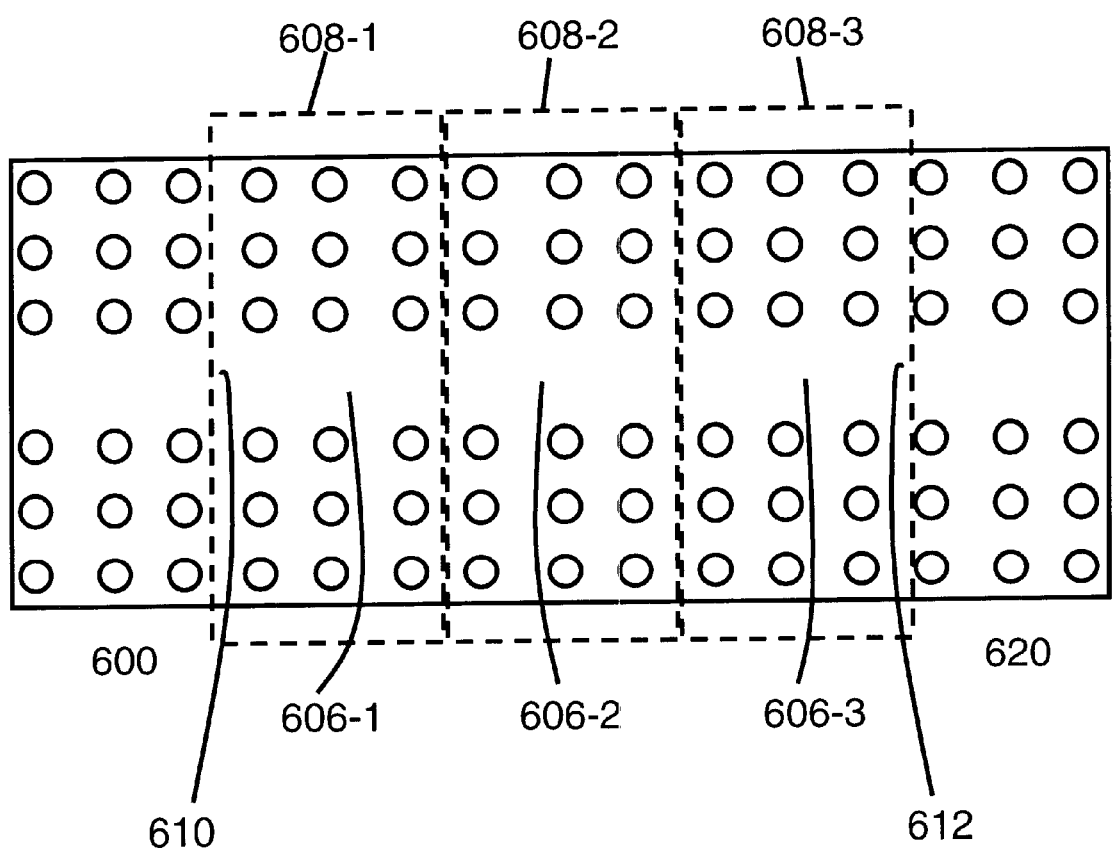
FIGS. 35 and 36 are top views of a variable attenuator constructed in accordance with the present invention in an unactuated state and an actuated state, respectively.
Figure 36:
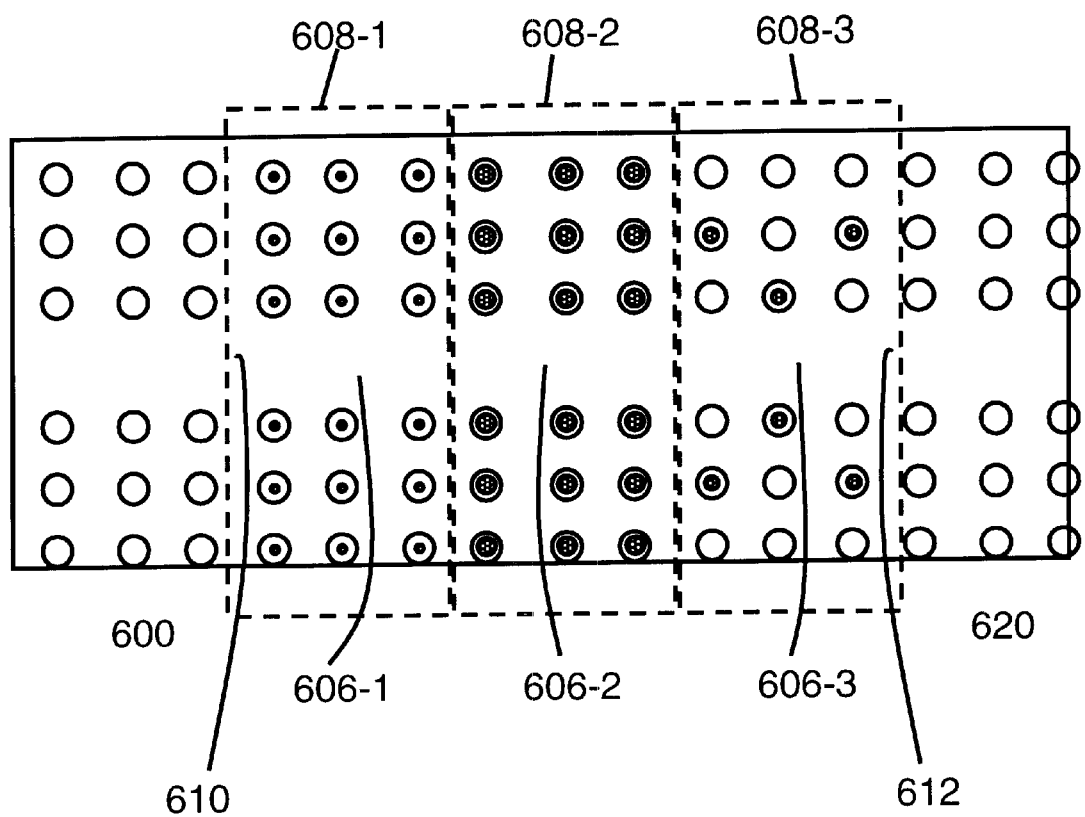

A variable optical attenuator constructed in accordance with the present invention is shown in top view in FIGS. 35–36. The defect waveguide of this device includes an input waveguide segment 600, having an input end 602 and a back end 604. The device also includes one or more attenuating waveguide segments 606, each of which is defined by an attenuating region 608 of the planar photonic crystal structure. In the exemplary embodiment depicted in FIGS. 35–36, there are three attenuating waveguide segments; however, devices with different numbers of attenuating waveguide segments are contemplated in the present invention. Each attenuating segment has a front end 610 and a back end 612, with the front end of the first attenuating waveguide segment being coupled to the back end 604 of the input waveguide, and the front end of each subsequent attenuating waveguide segment being coupled to the back end of the previous attenuating waveguide segment. The exemplary device further includes an output waveguide segment 620 having a front end 622 and an output end 624, the front end of the output waveguide segment being coupled to the back end of the last of the attenuating waveguide segments. In the unactuated device of FIG. 35, the optical signal is prohibited from propagating in the photonic crystal structure of the attenuating regions, and therefore propagates through the device from the input end to the output end with little loss.

A view of an actuated device is shown in FIG. 36. In this view, it is evident that the device includes a set of columnar rods 630 for each attenuating waveguide segment, with each rod of each set being registered to one of the holes of the attenuating region corresponding to its set. Each set of columnar rods 630 is coupled to an actuator (not shown) as described hereinabove. Actuation of each set of columnar rods will perturb the optical properties of the corresponding attenuating waveguide segment. For example, insertion of small rods, as in attenuating region 608-1, may allow a small fraction of an optical signal propagating through the corresponding attenuating waveguide segment 606-1 to couple into the planar photonic crystal structure, thereby attenuating the optical signal propagating therethrough by a small amount. Similarly, insertion of large rods, as shown in attenuating region 608-2, may allow a large fraction of the optical signal propagating through attenuating waveguide segment 606-2 to couple into the planar photonic crystal structure, thereby drastically attenuating the optical signal. In attenuating region 608-3, only a few rods are inserted; as the person of skill in the art will recognize, such a minor perturbation of the planar photonic crystal structure may have a significant effect on an optical signal propagating through the corresponding attenuating waveguide segment 606-3.

The propagation properties of a planar photonic crystal structure may likewise be controlled by reversibly filling the holes of the planar photonic crystal with a liquid. By using methods analogous to those described herein and well known to the skilled artisan, the planar photonic crystal structure shown in side view in FIGS. 37 and 38 may be fabricated. This structure includes a silicon planar photonic crystal structure 700 having columnar holes 702. Underneath the planar photonic crystal structure is a cavity 704, which serves as an undercladding for the planar photonic crystal and is in fluid communication with a set of the holes. Cavity 704 is in fluid communication with microfluidic pump 706 via channel 708. Microfluidic pumps are well known in the art, and are thus not described in detail here.

Figure 37:
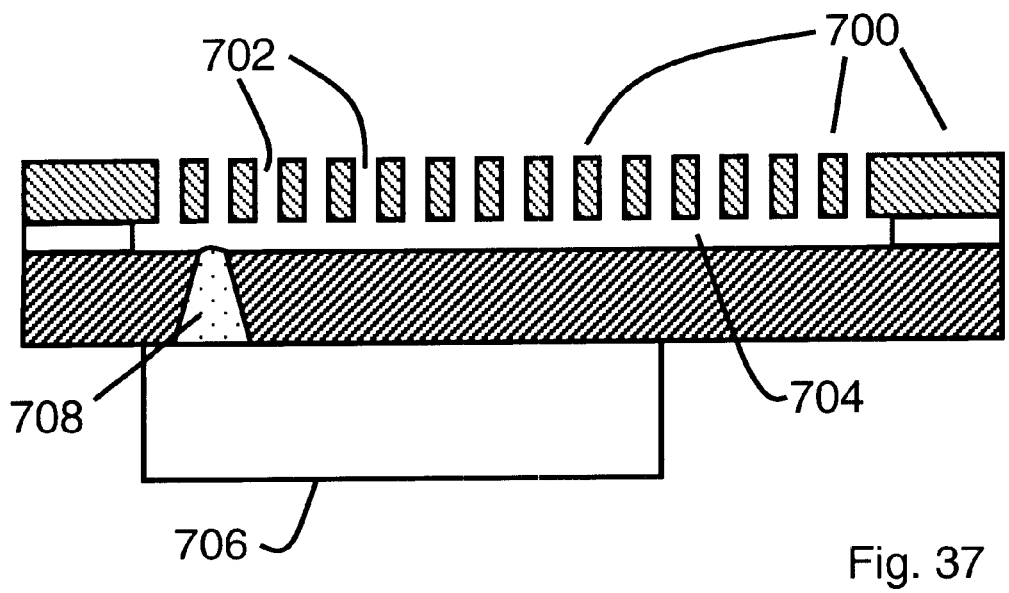
FIGS. 37 and 38 are side views of a microfluidic device of the present invention in an unactuated state and an actuated state, respectively.
Figure 38:
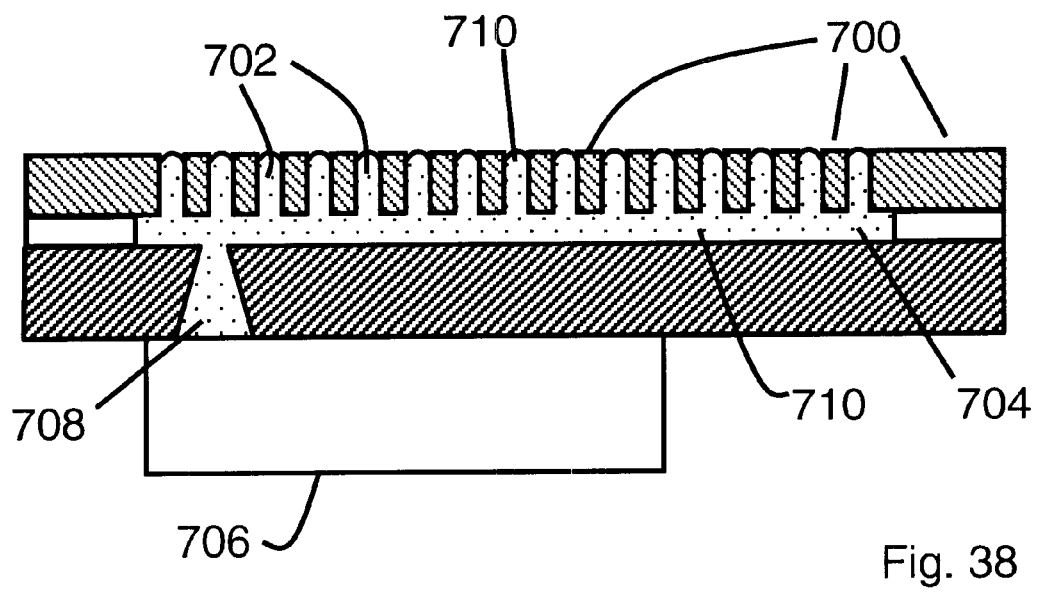

In an unactuated state, as shown in FIG. 37, the cavity 704 and the holes 702 are filled with air. To actuate the device, as shown in FIG. 38, the pump 706 pumps fluid 710 through channel 708 and into cavity 704 and the holes 702, changing the refractive index of the holes and therefore the parameters of the planar photonic crystal structure. Thus, the propagation of an optical signal in the planar photonic crystal will be modified by actuation of the device. To deactuate, the pump can pull the fluid out of the cavity and the holes. The choice of fluid is generally not critical, and will depend upon many factors, such as, for example, the desired refractive index change and the materials of the device. The fluid is desirably inert, non-volatile, compatible with the materials of the device, and not exceedingly viscous. For example, the liquid silicones available from Dow Corning may be advantageously used in this device. In order to inhibit the liquid remaining in the holes due to capillary forces, the holes and cavity may be coated with a non-wetting surface treatment. For example, a silicon/silica based device may be coated with (1,1,2,2-tetrahydroperfluorooctyl)trichlorosilane.

As the person of skill in the art will recognize, devices such as those described for the hole-filling rod embodiments described above may be fabricated in accordance with the present invention. In some devices, it may be desirable to have one or more additional cavities, each in fluid communication with an additional pump and with a unique set of the columnar holes of the planar photonic crystal. In these devices, each pump is separately actuable to modify the propagation of the optical signal in the planar photonic crystal structure.

In light of the present disclosure, the skilled artisan will recognize that devices having a wide variety of architectures and functionalities may be fabricated in accordance with the present invention. For example, the present invention may be used in conjunction with planar photonic crystal AWG, coupler, filter, and splitter/combiner designs known to one of skill in the art.

As described above and understood by the skilled artisan, the function of a planar photonic crystal defect waveguide device is highly dependent on the wavelengths of the optical signal propagating therethrough. This property may be used advantageously in connection with this invention to make devices with wavelength-dependent functionality. For example, the variable optical attenuator of FIG. 26 may be designed to attenuate a first wavelength of an optical signal, while leaving a second wavelength undisturbed. These devices may be designed using the calculation methods known in the art as well as those described in the Optics Communications paper incorporated by reference herein.

As previously noted, the optical devices of the present invention may be employed for implementing a variety of optical switching functions in an optical communication system, including optical fiber communications switching modules and equipment, optical computing, optical sensor arrays, antennae arrays, and other applications where optical waveguides, optical fibers, or other guided or partially-guided light signal transmission media are utilized to route light signals for voice, data, and other information-carrying purposes.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical device for controlling propagation of an optical signal, the optical signal including light of one or more wavelengths, the optical device comprising:

a planar photonic crystal structure having a structural symmetry, the planar photonic crystal structure including columnar holes arranged in an array having a pitch;

a defect waveguide formed in the planar photonic crystal structure, the defect waveguide including a first waveguide segment and a second waveguide segment; and a dimensional actuating device coupled to the planar photonic crystal structure, wherein the optical signal propagates in the defect waveguide, and actuation of the dimensional actuating device changes a dimension of the planar photonic crystal structure, such that the distribution of the optical signal between the first waveguide segment and the second waveguide segment is modified.

2. The optical device of claim 1 wherein the actuation of the dimensional actuating device changes the pitch of the planar photonic crystal in at least one dimension.

3. The optical device of claim 1 wherein the actuation of the dimensional actuating device changes the shape of the columnar holes of the planar photonic crystal.

4. The optical device of claim 1 wherein the actuation of the dimensional actuating device changes the structural symmetry of the planar photonic crystal.

5. The optical device of claim 1 wherein the dimensional actuating device is a piezoelectric actuator.

6. The optical device of claim 1 wherein the dimensional actuating device is a mechanical actuator.

7. The optical device of claim 1 wherein the defect waveguide includes
an input waveguide segment having an input end and a junction end;
a first output waveguide segment having a junction end and an output end, the junction end being coupled to the junction end of the input waveguide segment;
a second output waveguide segment having a junction end and an output end, the junction end being coupled to the junction end of the input waveguide segment and the junction end of the first output waveguide segment, and
wherein the optical signal enters the defect waveguide at the input end of the input waveguide segment; and actuation of the dimensional actuating device changes the distribution of the optical signal between the first output waveguide segment and the second output waveguide segment.

8. The optical device of claim 7 wherein the optical signal propagates from the input waveguide segment to the first output waveguide segment when the dimensional actuating device is unactuated, and propagates from the input waveguide segment to the second output waveguide segment when the dimensional actuating device is actuated to a fully switched state.

9. The optical device of claim 7 wherein the first output waveguide segment is positioned at an angle of about 90° to the second output waveguide segment.

10. The optical device of claim 1 wherein the defect waveguide includes
a first waveguide segment having an input end, an output end, and a coupling region, and
a second waveguide segment having an input end, an output end, and a coupling region;
wherein the first waveguide segment and the second waveguide segment are evanescently coupled to one another in their coupling regions, and substantially uncoupled otherwise; and
wherein the optical signal enters the defect waveguide at the input end of one of the waveguide segments; and actuation of the dimensional actuating device changes the distribution of the optical signal between the output end of the first waveguide segment and the output end of the second waveguide segment.

11. The optical device of claim 10 wherein the optical signal entering the defect waveguide at the input end of the first waveguide segment emerges
from the output end of the first waveguide segment if the dimensional actuating device is unactuated, and
from the output end of the second waveguide segment if the dimensional actuating device is actuated to a fully switched state.

12. The optical device of claim 1 wherein the defect waveguide includes an input end and an output end, and actuation of the dimensional actuating device attenuates the optical signal.

13. The optical device of claim 12 wherein the optical signal includes light of a first wavelength and a second wavelength, and the actuation of the dimensional actuating device attenuates the light of the first wavelength to a different degree than it does the light of the second wavelength.

14. An optical device for controlling propagation of an optical signal, the optical signal including light of one or more wavelengths, the optical device comprising:
a planar photonic crystal structure having a structural symmetry, the planar photonic crystal structure including columnar holes arranged in an array having a pitch;
a defect waveguide formed in the planar photonic crystal structure, the defect waveguide including
an input waveguide segment with an input end and a splitter end,
a first arm waveguide segment with a splitter end and a combiner end, the splitter end being coupled to the splitter end of the input waveguide segment,
a second arm waveguide segment with a splitter end and a combiner end, the splitter end being coupled to the splitter end of the input waveguide and the splitter end of the first arm waveguide segment, the combiner end being coupled to the combiner end of the first arm waveguide segment, and
an output waveguide with a combiner end and an output end, the combiner end being coupled to the combiner end of the first waveguide segment and the combiner end of the second waveguide segment,
wherein the optical signal enters the defect waveguide at the input end of the input waveguide segment; and actuation of the dimensional actuating device changes the intensity of the optical signal propagating through the output waveguide segment.

15. The optical device of claim 14 wherein the first waveguide arm segment has a different length than the second waveguide arm segment.

16. The optical device of claim 14 wherein the first waveguide arm segment is defined by a region of the planar photonic crystal structure with a first set of photonic crystal parameters, and the second waveguide arm segment is defined by a region of the planar photonic crystal structure with a second set of photonic crystal parameters; and
wherein the first set of photonic crystal parameters differs from the second set of photonic crystal parameters.

17. An optical device for use with an optical signal, the optical signal including light of one or more wavelengths, the optical device comprising:
a planar photonic crystal structure, the planar photonic crystal structure including a bulk material with columnar holes formed therethrough, the columnar holes being substantially parallel, the columnar holes having a columnar axis;
a set of columnar rods, each rod being registered to one of the columnar holes of the planar photonic crystal structure; and
an actuator, the actuator being coupled to the set of columnar rods,
wherein actuation of the actuator moves the set of columnar rods along the columnar axis within the columnar holes of the planar photonic crystal structure.

18. The optical device of claim 17 further comprising:
one or more additional sets of columnar rods, each rod being registered to one of the columnar holes of the planar photonic crystal structure; and
one or more additional actuators, each actuator being coupled one of the additional sets of columnar rods,
wherein each actuator is separately actuable to modify the propagation of the optical signal in the planar photonic crystal structure.

19. The optical device of claim 17 further comprising
a defect waveguide defined by the planar photonic crystal structure,
wherein the optical signal propagates in the defect waveguide, and actuation of the actuator modifies the propagation of the optical signal in the defect waveguide.

20. The optical device of claim 19 wherein the defect waveguide includes:
- a first waveguide segment having an input segment, an output segment, and a bend segment coupling the input segment to the output segment, and
- a second waveguide segment having an input segment, an output segment, and a bend segment coupling the input segment to the output segment;

wherein the input segment of the first waveguide segment is collinear with the output segment of the second waveguide segment, and the input segment of the second waveguide segment is collinear with the output segment of the first waveguide segment;
wherein the planar photonic crystal structure includes a switching region contiguous with the bend segments of the first and second waveguide;
wherein the columnar rods are registered to columnar holes in the switching region of the planar photonic crystal structure;
wherein with the device in an unactuated state, an optical signal entering the input segment of the first waveguide segment propagates through the output segment of the first waveguide segment, and an optical signal entering the input segment of the second waveguide segment propagates through the output segment of the second waveguide segment; and
wherein actuation of the actuator to a fully switched state inserts the set of columnar rods into the columnar holes of the planar photonic crystal structure of the switching region, such that an optical signal entering the input segment of the first waveguide segment propagates through the output segment of the second waveguide segment, and an optical signal entering the input segment of the second waveguide segment propagates through the output segment of the first waveguide segment.

21. The optical device of claim 19 wherein the defect waveguide includes
- an input waveguide segment, having an input end and an coupler end,
- a first output waveguide segment, having a coupler end and an output end, and
- a second output waveguide segment, having a coupler end and an output end; and wherein the planar photonic crystal structure includes
- a first coupling region, the first coupling region being coupled to the coupler end of the input waveguide segment and the coupler end of the first output waveguide segment, and
- a second coupling region, the second coupling region being coupled to the coupler end of the input waveguide segment and the coupler end of the second output waveguide segment; and wherein the set of columnar rods is registered to the columnar holes of the first coupling region of the planar photonic crystal structure;
wherein the optical device further includes
- a second set of columnar rods, each rod of the second set of columnar rods being registered to one of the columnar holes of the second coupling region of t the planar photonic crystal structure, and
- a second actuator, the actuator being coupled to the second set of columnar rods;

wherein actuation of the second actuator moves the second set of columnar rods along the columnar axis within the columnar holes of the coupling region of the planar photonic crystal structure; and wherein actuation of the actuator controls the coupling of the optical signal from the input waveguide segment to the first output waveguide segment, and actuation of the second actuator controls the coupling of the optical signal from the input waveguide segment to the second output waveguide segment.

22. The optical device of claim 19 wherein the defect waveguide includes
- an input waveguide segment having an input end and an back end,
- one or more attenuating waveguide segments, each attenuating segment being defined by an attenuating region of the planar photonic crystal structure, each attenuating segment having a front end and a back end, the front end of the first attenuating waveguide segment being coupled to the back end of the input waveguide segment, the front end of each subsequent attenuating waveguide segments being coupled to the back end of the previous attenuating waveguide segments, and
- an output waveguide segment having a front end and an output end, the front end of the output waveguide segment being coupled to the back end of the last of the attenuating waveguide segments;

wherein the rods of the set of columnar rods are registered to the holes of the first attenuating region;
wherein the device further includes an additional set of columnar rods for each attenuating waveguide segment after the first, each rod of each set of columnar rods being registered to one of the holes of the attenuating region corresponding to its set; and an actuator coupled to each additional set of columnar rods, wherein actuation of each actuator moves the corresponding set of columnar rods along the columnar axis within the columnar holes of the corresponding attenuating region of the planar photonic crystal structure; and
wherein actuation of each set of columnar rods of the optical device causes an optical attenuation in the waveguide segment corresponding to the actuator.

23. An optical device for use with an optical signal, the optical signal comprising light of one or more wavelengths, the optical device comprising:
- a planar photonic crystal structure, the planar photonic crystal structure including a bulk material with columnar holes formed therethrough, the columnar holes being substantially parallel, the columnar holes having a columnar axis;
- a cavity in fluid communication with a set of the columnar holes of the planar photonic crystal structure; and
- a microfluidic pump in fluid communication with the cavity, wherein actuation of the microfluidic pump moves a fluid within the cavity and the columnar holes, thereby changing the propagation of the optical signal in the planar photonic crystal structure.

24. The optical device of claim 23 further comprising
- one or more additional cavities, each cavity being in fluid communication with a unique set of the columnar holes of the planar photonic crystal structure; and
- one or more additional microfluidic pumps, each additional pump being in fluid communication with one of the additional cavities, wherein each pump is separately actuable to modify the propagation of the optical signal in the planar photonic crystal structure.

* * * * *